(12) United States Patent
Schlesinger et al.

(10) Patent No.: US 9,832,749 B2
(45) Date of Patent: Nov. 28, 2017

(54) LOW ACCURACY POSITIONAL DATA BY DETECTING IMPROBABLE SAMPLES

(71) Applicant: Microsoft Technology Licensing, LLC, Redmond, WA (US)

(72) Inventors: Benny Schlesinger, Ramat Hasharon (IL); Vadim Kuper, Yokneam Illit (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 127 days.

(21) Appl. No.: 14/504,451

(22) Filed: Oct. 2, 2014

(65) Prior Publication Data

US 2015/0018008 A1    Jan. 15, 2015

Related U.S. Application Data

(62) Division of application No. 13/152,299, filed on Jun. 3, 2011, now Pat. No. 8,981,995.

(51) Int. Cl.
*G01S 3/02* (2006.01)
*H04W 64/00* (2009.01)
*G01S 19/42* (2010.01)
*H04W 4/02* (2009.01)

(52) U.S. Cl.
CPC ............ *H04W 64/00* (2013.01); *G01S 19/42* (2013.01); *H04W 4/027* (2013.01)

(58) Field of Classification Search
CPC ............ G01S 5/02; G01S 5/0252; G01S 5/14
USPC ..... 342/451, 457, 463, 465, 461; 455/456.1, 455/456.6
See application file for complete search history.

(56) References Cited

U.S. PATENT DOCUMENTS

| | | |
|---|---|---|
| 4,357,593 A | 11/1982 | von Tomkewitsch |
| 4,796,191 A | 1/1989 | Honey et al. |
| 4,979,983 A | 12/1990 | Nishikawa et al. |
| 5,394,333 A | 2/1995 | Kao |
| 5,493,692 A | 2/1996 | Theimer et al. |
| 5,544,321 A | 8/1996 | Theimer et al. |
| 5,555,376 A | 9/1996 | Theimer et al. |
| 5,564,079 A | 10/1996 | Olsson |
| 5,592,173 A | 1/1997 | Lau et al. |
| 5,603,054 A | 2/1997 | Theimer et al. |
| 5,611,050 A | 3/1997 | Theimer et al. |
| 5,623,194 A | 4/1997 | Boll et al. |
| 5,629,855 A | 5/1997 | Kyrtsos et al. |

(Continued)

FOREIGN PATENT DOCUMENTS

| | | |
|---|---|---|
| CN | 1375999 | 10/2002 |
| CN | 1488955 | 4/2004 |

(Continued)

OTHER PUBLICATIONS

Improve GPS Positioning Accuracy with Context Awareness; Huang et al.; Published Date: Jul. 31-Aug. 1, 2008; pp. 94-99

(Continued)

*Primary Examiner* — Dao Phan

(57) ABSTRACT

An embodiment of the invention provides a method of determining a location of a mobile target that processes locations for the target provided by a wireless location technology tracker system to determine moving averages of velocity of the target, determines if the locations are outliers responsive to the moving averages, discards locations that are determined to be outliers, and uses locations determined not to be outliers as locations for the target.

20 Claims, 4 Drawing Sheets

FIG 1B

(56) References Cited

U.S. PATENT DOCUMENTS

| | | |
|---|---|---|
| 5,781,704 A | 7/1998 | Rossmo |
| 5,812,865 A | 9/1998 | Theimer et al. |
| 5,842,130 A | 11/1998 | Oprescu-Surcobe |
| 5,845,227 A | 12/1998 | Peterson |
| 5,883,598 A | 3/1999 | Parl et al. |
| 5,943,621 A | 8/1999 | Ho et al. |
| 5,948,040 A | 9/1999 | DeLorme et al. |
| 5,978,732 A | 11/1999 | Kakitani et al. |
| 6,052,598 A | 4/2000 | Rudrapatna |
| 6,078,826 A | 6/2000 | Croft et al. |
| 6,116,363 A | 9/2000 | Frank |
| 6,122,572 A | 9/2000 | Yavnai |
| 6,175,805 B1 | 1/2001 | Abe |
| 6,292,687 B1 | 9/2001 | Lowell et al. |
| 6,313,786 B1 | 11/2001 | Sheynblat et al. |
| 6,314,347 B1 | 11/2001 | Kuroda et al. |
| 6,323,807 B1 | 11/2001 | Golding et al. |
| 6,353,398 B1 | 3/2002 | Amin et al. |
| 6,381,522 B1 | 4/2002 | Watanabe et al. |
| 6,405,134 B1 | 6/2002 | Smith et al. |
| 6,418,424 B1 | 7/2002 | Hoffberg et al. |
| 6,466,232 B1 | 10/2002 | Newell et al. |
| 6,480,783 B1 | 11/2002 | Myr |
| 6,490,519 B1 | 12/2002 | Lapidot et al. |
| 6,513,046 B1 | 1/2003 | Abbott et al. |
| 6,522,266 B1 | 2/2003 | Soehren et al. |
| 6,549,915 B2 | 4/2003 | Abbott, III et al. |
| 6,556,832 B1 | 4/2003 | Soliman |
| 6,564,149 B2 | 5/2003 | Lai |
| 6,574,351 B1 | 6/2003 | Miyano |
| 6,577,946 B2 | 6/2003 | Myr |
| 6,603,405 B2 | 8/2003 | Smith |
| 6,615,130 B2 | 9/2003 | Myr |
| 6,668,227 B2 | 12/2003 | Hamada et al. |
| 6,672,506 B2 | 1/2004 | Swartz et al. |
| 6,678,525 B1 | 1/2004 | Baranger |
| 6,721,572 B1 | 4/2004 | Smith et al. |
| 6,741,188 B1 | 5/2004 | Miller et al. |
| 6,747,675 B1 | 6/2004 | Abbott et al. |
| D494,584 S | 8/2004 | Schlieffers et al. |
| 6,791,580 B1 | 9/2004 | Abbott et al. |
| 6,796,505 B2 | 9/2004 | Pellaumail et al. |
| 6,799,047 B1 | 9/2004 | Bahl et al. |
| 6,801,223 B1 | 10/2004 | Abbott et al. |
| 6,807,483 B1 | 10/2004 | Chao et al. |
| 6,810,325 B2 | 10/2004 | Amano et al. |
| 6,812,937 B1 | 11/2004 | Abbott et al. |
| 6,837,436 B2 | 1/2005 | Swartz et al. |
| 6,842,877 B2 | 1/2005 | Robarts et al. |
| 6,845,324 B2 | 1/2005 | Smith |
| RE38,724 E | 4/2005 | Peterson |
| 6,889,382 B1 | 5/2005 | Anderson |
| 6,925,378 B2 | 8/2005 | Tzamaloukas |
| 6,992,625 B1 | 1/2006 | Krumm et al. |
| 7,010,501 B1 | 3/2006 | Roslak et al. |
| 7,040,541 B2 | 5/2006 | Swartz et al. |
| 7,054,938 B2 | 5/2006 | Sundqvist et al. |
| 7,058,506 B2 | 6/2006 | Kawase et al. |
| 7,063,263 B2 | 6/2006 | Swartz et al. |
| 7,084,762 B2 | 8/2006 | Pedrazzini et al. |
| 7,096,030 B2 | 8/2006 | Huomo |
| 7,116,987 B2 | 10/2006 | Spain, Jr. et al. |
| 7,116,988 B2 | 10/2006 | Dietrich |
| 7,127,213 B2 | 10/2006 | Haymes |
| 7,130,743 B2 | 10/2006 | Kudo et al. |
| 7,161,914 B2 | 1/2007 | Shoaib et al. |
| 7,162,367 B2 | 1/2007 | Lin et al. |
| 7,171,378 B2 | 1/2007 | Petrovich et al. |
| 7,188,025 B2 | 3/2007 | Hudson, Jr. |
| 7,195,157 B2 | 3/2007 | Swartz et al. |
| 7,200,394 B2 | 4/2007 | Aoki et al. |
| 7,215,969 B2 | 5/2007 | Benco et al. |
| 7,233,861 B2 | 6/2007 | Van Buer et al. |
| 7,250,907 B2 | 7/2007 | Krumm et al. |
| 7,299,059 B2 | 11/2007 | Misikangas et al. |
| 7,321,774 B1 | 1/2008 | Lau et al. |
| 7,349,683 B2 | 3/2008 | Misikangas et al. |
| 7,359,713 B1 | 4/2008 | Tiwari |
| 7,385,501 B2 | 6/2008 | Miller et al. |
| 7,392,134 B2 | 6/2008 | Tauchi et al. |
| 7,433,696 B2 | 10/2008 | Dietrich et al. |
| 7,463,890 B2 | 12/2008 | Herz et al. |
| 7,512,462 B2 | 3/2009 | Nichols et al. |
| 7,565,157 B1 | 7/2009 | Ortega et al. |
| 7,590,589 B2 | 9/2009 | Hoffberg |
| 7,617,042 B2 | 11/2009 | Horvitz et al. |
| 7,630,986 B1 | 12/2009 | Herz et al. |
| 7,636,707 B2 | 12/2009 | Chaudhuri et al. |
| 7,698,055 B2 | 4/2010 | Horvitz et al. |
| 7,705,728 B2 | 4/2010 | Mock et al. |
| 7,706,964 B2 | 4/2010 | Horvitz |
| 7,739,040 B2 | 6/2010 | Horvitz |
| 7,796,944 B2 | 9/2010 | Eaton et al. |
| 7,796,966 B2 | 9/2010 | Bhattacharya |
| 7,813,870 B2 | 10/2010 | Downs et al. |
| 7,835,863 B2 | 11/2010 | Lokshin |
| 7,840,340 B2 | 11/2010 | Graham et al. |
| 7,856,234 B2 | 12/2010 | Alizadeh-Shabdiz |
| 7,864,048 B1 | 1/2011 | Cope et al. |
| 7,873,368 B2 | 1/2011 | Goren |
| 7,899,611 B2 | 3/2011 | Downs et al. |
| 7,912,628 B2 | 3/2011 | Chapman et al. |
| 7,925,426 B2 | 4/2011 | Koebler et al. |
| 7,961,651 B2 | 6/2011 | Kim et al. |
| 7,962,156 B2 | 6/2011 | Robertson |
| 7,991,718 B2 | 8/2011 | Horvitz et al. |
| 8,024,112 B2 | 9/2011 | Krumm et al. |
| 8,090,530 B2 | 1/2012 | Horvitz et al. |
| 8,126,641 B2 | 2/2012 | Horvitz et al. |
| 8,155,872 B2 | 4/2012 | Kjeldsen et al. |
| 8,165,773 B1 | 4/2012 | Chavez et al. |
| 8,174,447 B2 | 5/2012 | Loidi |
| 8,180,366 B2 | 5/2012 | Ernst |
| 8,190,362 B2 | 5/2012 | Barker et al. |
| 8,228,234 B2 | 7/2012 | Paulson et al. |
| 8,244,272 B2 | 8/2012 | Morgan et al. |
| 8,255,275 B2 | 8/2012 | Collopy et al. |
| 8,260,481 B2 | 9/2012 | Naik et al. |
| 8,311,730 B2 | 11/2012 | Neff |
| 8,320,939 B1 | 11/2012 | Vincent |
| 8,433,334 B2 | 4/2013 | Huang et al. |
| 8,433,512 B1 | 4/2013 | Lopatenko et al. |
| 8,443,662 B2 | 5/2013 | Lane et al. |
| 8,463,545 B2 | 6/2013 | Boore et al. |
| 8,484,113 B2 | 7/2013 | Collopy et al. |
| 8,519,860 B2 | 8/2013 | Johnson et al. |
| 8,532,670 B2 | 9/2013 | Kim et al. |
| 8,538,686 B2 | 9/2013 | Gruen et al. |
| 8,560,218 B1 | 10/2013 | Kahn et al. |
| 8,565,783 B2 | 10/2013 | Yang et al. |
| 8,566,029 B1 | 10/2013 | Lopatenko et al. |
| 8,589,065 B2 | 11/2013 | Scofield et al. |
| 8,620,692 B2 | 12/2013 | Collopy et al. |
| 8,639,803 B2 | 1/2014 | Moritz et al. |
| 8,712,931 B1 | 4/2014 | Wahlen et al. |
| 8,718,938 B2 | 5/2014 | Wolf et al. |
| 8,751,146 B2 | 6/2014 | Shrivathsan et al. |
| 8,762,053 B1 | 6/2014 | Lehman |
| 8,788,606 B2 | 7/2014 | Johnson et al. |
| 8,825,381 B2 | 9/2014 | Tang |
| 8,898,002 B2 | 11/2014 | Barrett |
| 8,981,995 B2 | 3/2015 | Schlesinger |
| 8,990,333 B2 | 3/2015 | Johnson et al. |
| 9,134,137 B2 | 9/2015 | Brush |
| 9,310,462 B2 | 4/2016 | Chintalapudi et al. |
| 9,429,657 B2 | 8/2016 | Sidhu |
| 9,442,181 B2 | 9/2016 | Haik |
| 9,464,903 B2 | 10/2016 | Sidhu |
| 9,470,529 B2 | 10/2016 | Sidhu |
| 2001/0029425 A1 | 10/2001 | Myr |
| 2001/0030664 A1 | 10/2001 | Shulman et al. |
| 2001/0040590 A1 | 11/2001 | Abbott et al. |
| 2001/0040591 A1 | 11/2001 | Abbott et al. |
| 2001/0043231 A1 | 11/2001 | Abbott et al. |

(56) References Cited

U.S. PATENT DOCUMENTS

| | | |
|---|---|---|
| 2001/0043232 A1 | 11/2001 | Abbott et al. |
| 2002/0032689 A1 | 3/2002 | Abbott et al. |
| 2002/0044152 A1 | 4/2002 | Abbott et al. |
| 2002/0050944 A1 | 5/2002 | Sheynblat et al. |
| 2002/0052930 A1 | 5/2002 | Abbott et al. |
| 2002/0052963 A1 | 5/2002 | Abbott et al. |
| 2002/0054130 A1 | 5/2002 | Abbott et al. |
| 2002/0054174 A1 | 5/2002 | Abbott et al. |
| 2002/0067289 A1 | 6/2002 | Smith |
| 2002/0078204 A1 | 6/2002 | Newell et al. |
| 2002/0080155 A1 | 6/2002 | Abbott et al. |
| 2002/0080156 A1 | 6/2002 | Abbott et al. |
| 2002/0083025 A1 | 6/2002 | Robarts et al. |
| 2002/0083158 A1 | 6/2002 | Abbott et al. |
| 2002/0087525 A1 | 7/2002 | Abbott et al. |
| 2002/0099817 A1 | 7/2002 | Abbott et al. |
| 2002/0107618 A1 | 8/2002 | Deguchi et al. |
| 2003/0036842 A1 | 2/2003 | Hancock |
| 2003/0042051 A1 | 3/2003 | Kriger |
| 2003/0046401 A1 | 3/2003 | Abbott et al. |
| 2003/0069683 A1 | 4/2003 | Lapidot et al. |
| 2003/0135304 A1 | 7/2003 | Sroub et al. |
| 2003/0139863 A1 | 7/2003 | Toda et al. |
| 2003/0140088 A1 | 7/2003 | Robinson et al. |
| 2003/0153338 A1 | 8/2003 | Herz et al. |
| 2003/0154009 A1 | 8/2003 | Basir et al. |
| 2003/0154476 A1 | 8/2003 | Abbott et al. |
| 2003/0195700 A1 | 10/2003 | Hamada et al. |
| 2003/0229471 A1 | 12/2003 | Guralnik et al. |
| 2003/0229895 A1 | 12/2003 | Jasinschi et al. |
| 2004/0019603 A1 | 1/2004 | Haigh et al. |
| 2004/0068364 A1 | 4/2004 | Zhao et al. |
| 2004/0090121 A1 | 5/2004 | Simonds et al. |
| 2004/0090346 A1 | 5/2004 | Simonds et al. |
| 2004/0092253 A1 | 5/2004 | Simonds et al. |
| 2004/0093154 A1 | 5/2004 | Simonds et al. |
| 2004/0093155 A1 | 5/2004 | Simonds et al. |
| 2004/0128066 A1 | 7/2004 | Kudo et al. |
| 2004/0153445 A1 | 8/2004 | Horvitz et al. |
| 2004/0166877 A1 | 8/2004 | Spain et al. |
| 2004/0167667 A1 | 8/2004 | Goncalves |
| 2004/0176211 A1 | 9/2004 | Kitajima et al. |
| 2004/0180671 A1 | 9/2004 | Spain |
| 2004/0181340 A1 | 9/2004 | Smith |
| 2004/0189475 A1 | 9/2004 | Cooper et al. |
| 2004/0201500 A1 | 10/2004 | Miller et al. |
| 2004/0230374 A1 | 11/2004 | Tzamakoukas |
| 2004/0260457 A1 | 12/2004 | Kawase et al. |
| 2004/0266457 A1 | 12/2004 | Dupray |
| 2004/0268403 A1 | 12/2004 | Krieger et al. |
| 2005/0021417 A1 | 1/2005 | Kassan |
| 2005/0034078 A1 | 2/2005 | Abbott et al. |
| 2005/0037775 A1 | 2/2005 | Moeglein et al. |
| 2005/0046584 A1 | 3/2005 | Breed |
| 2005/0048946 A1 | 3/2005 | Holland |
| 2005/0049900 A1 | 3/2005 | Hirose et al. |
| 2005/0062643 A1 | 3/2005 | Pande et al. |
| 2005/0086004 A1 | 4/2005 | Smith |
| 2005/0107946 A1 | 5/2005 | Shimizu et al. |
| 2005/0125148 A1 | 6/2005 | Van Buer et al. |
| 2005/0131607 A1 | 6/2005 | Breed |
| 2005/0144318 A1 | 6/2005 | Chang |
| 2005/0149253 A1 | 7/2005 | Nambata |
| 2005/0197775 A1 | 9/2005 | Smith |
| 2005/0219120 A1 | 10/2005 | Chang |
| 2005/0228553 A1 | 10/2005 | Tryon |
| 2005/0240378 A1 | 10/2005 | Smith et al. |
| 2005/0261004 A1 | 11/2005 | Dietrich |
| 2005/0266858 A1 | 12/2005 | Miller et al. |
| 2005/0272442 A1 | 12/2005 | Miller et al. |
| 2005/0283503 A1 | 12/2005 | Hancock et al. |
| 2005/0285793 A1 | 12/2005 | Sugar et al. |
| 2006/0015254 A1 | 1/2006 | Smith |
| 2006/0019676 A1 | 1/2006 | Miller et al. |
| 2006/0022048 A1 | 2/2006 | Johnson |
| 2006/0052115 A1 | 3/2006 | Khushu |
| 2006/0167784 A1 | 7/2006 | Hoffberg |
| 2006/0200310 A1 | 9/2006 | Kim et al. |
| 2006/0241862 A1 | 10/2006 | Ichihara et al. |
| 2006/0256005 A1 | 11/2006 | Thandu et al. |
| 2006/0264211 A1 | 11/2006 | Kalhan et al. |
| 2006/0284765 A1 | 12/2006 | Bernhardt et al. |
| 2006/0286988 A1 | 12/2006 | Blume et al. |
| 2006/0287813 A1 | 12/2006 | Quigley |
| 2007/0008927 A1 | 1/2007 | Herz et al. |
| 2007/0042790 A1 | 2/2007 | Mohi et al. |
| 2007/0073832 A1 | 3/2007 | Curtis et al. |
| 2007/0091037 A1 | 4/2007 | Lee |
| 2007/0106465 A1 | 5/2007 | Adam et al. |
| 2007/0115174 A1 | 5/2007 | Herrick |
| 2007/0179792 A1 | 8/2007 | Kramer |
| 2007/0208495 A1 | 9/2007 | Chapman et al. |
| 2007/0225937 A1 | 9/2007 | Spiesberger |
| 2007/0287473 A1 | 12/2007 | Dupray |
| 2008/0005172 A1 | 1/2008 | Gutmann |
| 2008/0018529 A1 | 1/2008 | Yoshioka |
| 2008/0070593 A1 | 3/2008 | Altman et al. |
| 2008/0077326 A1 | 3/2008 | Funk et al. |
| 2008/0090591 A1 | 4/2008 | Miller et al. |
| 2008/0091537 A1 | 4/2008 | Miller et al. |
| 2008/0104225 A1 | 5/2008 | Zhang et al. |
| 2008/0129598 A1 | 6/2008 | Godefroy et al. |
| 2008/0161018 A1 | 7/2008 | Miller et al. |
| 2008/0180637 A1 | 7/2008 | Kjeldsen et al. |
| 2008/0191941 A1 | 8/2008 | Saban et al. |
| 2008/0234935 A1 | 9/2008 | Wolf et al. |
| 2008/0248815 A1 | 10/2008 | Busch |
| 2008/0249667 A1 | 10/2008 | Horvitz et al. |
| 2008/0262728 A1 | 10/2008 | Lokshin et al. |
| 2008/0268870 A1 | 10/2008 | Houri |
| 2008/0305808 A1 | 12/2008 | Chan et al. |
| 2008/0311947 A1 | 12/2008 | Soerensen et al. |
| 2008/0319658 A1 | 12/2008 | Horvitz et al. |
| 2008/0319660 A1 | 12/2008 | Horvitz et al. |
| 2009/0005061 A1 | 1/2009 | Ward et al. |
| 2009/0005975 A1 | 1/2009 | Forstall et al. |
| 2009/0009397 A1 | 1/2009 | Taylor |
| 2009/0043504 A1 | 2/2009 | Bandyopadhyay et al. |
| 2009/0051566 A1 | 2/2009 | Olsen et al. |
| 2009/0063038 A1 | 3/2009 | Shrivathsan et al. |
| 2009/0143082 A1 | 6/2009 | Begeja et al. |
| 2009/0149155 A1 | 6/2009 | Grossman |
| 2009/0177437 A1 | 7/2009 | Roumeliotis |
| 2009/0184849 A1 | 7/2009 | Nasiri et al. |
| 2009/0191892 A1 | 7/2009 | Kelley |
| 2009/0192709 A1 | 7/2009 | Yonker |
| 2009/0201896 A1 | 8/2009 | Davis et al. |
| 2009/0248301 A1 | 10/2009 | Judd et al. |
| 2009/0312032 A1 | 12/2009 | Bornstein |
| 2010/0010733 A1 | 1/2010 | Krumm |
| 2010/0039929 A1 | 2/2010 | Cho et al. |
| 2010/0070334 A1 | 3/2010 | Monteverde |
| 2010/0079332 A1 | 4/2010 | Garin |
| 2010/0079334 A1 | 4/2010 | Roh |
| 2010/0082247 A1 | 4/2010 | Klein et al. |
| 2010/0087230 A1 | 4/2010 | Peh |
| 2010/0090899 A1 | 4/2010 | Ahao et al. |
| 2010/0097269 A1 | 4/2010 | Loidl |
| 2010/0106603 A1 | 4/2010 | Dey et al. |
| 2010/0127926 A1 | 5/2010 | Wang |
| 2010/0131308 A1 | 5/2010 | Collopy et al. |
| 2010/0153007 A1 | 6/2010 | Crowley |
| 2010/0156708 A1 | 6/2010 | Chen |
| 2010/0161179 A1 | 6/2010 | McClure et al. |
| 2010/0174479 A1 | 7/2010 | Golding et al. |
| 2010/0176992 A1 | 7/2010 | T'Siobbel |
| 2010/0231383 A1 | 9/2010 | Levine et al. |
| 2010/0250133 A1 | 9/2010 | Buros |
| 2010/0250727 A1 | 9/2010 | King et al. |
| 2010/0255856 A1 | 10/2010 | Kansal et al. |
| 2010/0255858 A1 | 10/2010 | Juhasz |
| 2010/0310071 A1 | 12/2010 | Malone et al. |
| 2010/0323715 A1 | 12/2010 | Winters |
| 2010/0324813 A1 | 12/2010 | Sundararajan |

(56) References Cited

U.S. PATENT DOCUMENTS

| | | |
|---|---|---|
| 2010/0324815 A1 | 12/2010 | Hiruta et al. |
| 2010/0332125 A1 | 12/2010 | Tan et al. |
| 2011/0035142 A1 | 2/2011 | Tang |
| 2011/0039573 A1 | 2/2011 | Hardie |
| 2011/0050493 A1 | 3/2011 | Torimoto et al. |
| 2011/0071759 A1 | 3/2011 | Pande et al. |
| 2011/0148623 A1 | 6/2011 | Bishop et al. |
| 2011/0151839 A1 | 6/2011 | Bolon et al. |
| 2011/0151898 A1 | 6/2011 | Chandra et al. |
| 2011/0163914 A1 | 7/2011 | Seymour |
| 2011/0169632 A1 | 7/2011 | Walker |
| 2011/0178708 A1 | 7/2011 | Zhang et al. |
| 2011/0182238 A1 | 7/2011 | Marshall et al. |
| 2011/0184644 A1 | 7/2011 | McBurney |
| 2011/0191024 A1 | 8/2011 | DeLuca |
| 2011/0191052 A1 | 8/2011 | Lin et al. |
| 2011/0197200 A1 | 8/2011 | Huang et al. |
| 2011/0207471 A1 | 8/2011 | Murray et al. |
| 2011/0208430 A1 | 8/2011 | Tun et al. |
| 2011/0212732 A1 | 9/2011 | Garrett et al. |
| 2011/0227724 A1 | 9/2011 | Zhao et al. |
| 2011/0238289 A1 | 9/2011 | Lehman |
| 2011/0238308 A1 | 9/2011 | Miller et al. |
| 2011/0246059 A1 | 10/2011 | Tokashiki |
| 2011/0270940 A1 | 11/2011 | Johnson |
| 2011/0282571 A1 | 11/2011 | Krumm et al. |
| 2011/0291886 A1 | 12/2011 | Krieter |
| 2011/0306323 A1 | 12/2011 | Do et al. |
| 2011/0319094 A1 | 12/2011 | Usui et al. |
| 2012/0052873 A1 | 3/2012 | Wong |
| 2012/0089322 A1 | 4/2012 | Horvitz et al. |
| 2012/0121161 A1 | 5/2012 | Eade et al. |
| 2012/0143495 A1 | 6/2012 | Dantu |
| 2012/0158289 A1 | 6/2012 | Brush et al. |
| 2012/0173139 A1 | 7/2012 | Judd et al. |
| 2012/0176491 A1 | 7/2012 | Garin et al. |
| 2012/0188124 A1 | 7/2012 | Reidevall et al. |
| 2012/0203453 A1 | 8/2012 | Lundquist et al. |
| 2012/0209507 A1 | 8/2012 | Serbanescu |
| 2012/0218142 A1 | 8/2012 | Leclercq |
| 2012/0221244 A1 | 8/2012 | Georgy et al. |
| 2012/0238293 A9 | 9/2012 | Pan et al. |
| 2012/0259541 A1 | 10/2012 | Downey et al. |
| 2012/0259666 A1 | 10/2012 | Collopy et al. |
| 2012/0290615 A1 | 11/2012 | Lamb et al. |
| 2012/0299724 A1 | 11/2012 | Kuper |
| 2013/0002857 A1 | 1/2013 | Kulik |
| 2013/0030690 A1 | 1/2013 | Witmer |
| 2013/0035111 A1 | 2/2013 | Moeglein et al. |
| 2013/0095848 A1 | 4/2013 | Gold et al. |
| 2013/0110454 A1 | 5/2013 | Sidhu |
| 2013/0114687 A1 | 5/2013 | Kim et al. |
| 2013/0115971 A1 | 5/2013 | Marti et al. |
| 2013/0116921 A1 | 5/2013 | Kasargod et al. |
| 2013/0138314 A1 | 5/2013 | Vittala et al. |
| 2013/0211711 A1 | 8/2013 | Kelly et al. |
| 2013/0285849 A1 | 10/2013 | Ben-Moshe et al. |
| 2013/0297204 A1 | 11/2013 | Bartels |
| 2013/0332064 A1 | 12/2013 | Funk et al. |
| 2014/0070991 A1 | 3/2014 | Liu |
| 2014/0121960 A1 | 5/2014 | Park |
| 2014/0327547 A1 | 11/2014 | Johnson |
| 2015/0073697 A1 | 3/2015 | Barrett et al. |
| 2015/0339397 A1 | 11/2015 | Brush et al. |
| 2016/0353383 A1 | 12/2016 | Haik et al. |

FOREIGN PATENT DOCUMENTS

| | | |
|---|---|---|
| CN | 101109808 | 1/2008 |
| CN | 101251589 | 8/2008 |
| CN | 101675597 | 3/2010 |
| CN | 102006550 | 4/2011 |
| CN | 102204374 | 9/2011 |
| DE | 10042983 | 3/2002 |
| EP | 2293016 | 3/2011 |
| GB | 2431261 | 4/2007 |
| JP | 4364491 | 12/1992 |
| JP | 2007-083678 | 3/1995 |
| JP | 10132593 | 5/1998 |
| JP | 2011153446 | 8/1999 |
| JP | 2002328035 | 11/2002 |
| JP | 2004317160 | 11/2004 |
| JP | 2008-271277 | 5/2010 |
| KR | 19970071404 | 7/1997 |
| KR | 20040033141 | 4/2004 |
| KR | 20040050550 | 6/2004 |
| RU | 8141 | 10/1998 |
| WO | 9800787 | 1/1998 |
| WO | 2009039161 | 3/2009 |
| WO | 2009016505 | 5/2009 |
| WO | 2012085876 | 6/2012 |

OTHER PUBLICATIONS

Fuzzy processing on GPS data to improve the position accuracy; Lin et al.; Published Date: Dec. 11-14, 1996; IEEE; pp. 557-562

"International Search Report & Written Opinion for PCT Patent Application No. PCT/US2013/050963", dated Nov. 8, 2013, Filed Date: Jul. 17, 2013, 14 Pages.

Office Action dated Jun. 6, 2013 from U.S. Appl. No. 13/117,171, filed May 27, 2011.

"International Search Report", dated Jan. 21, 2013. Application No. PCT/US2012/040140, filed: May 31, 2012, pp. 1-18.

Office Action dated Dec. 6, 2013 from U.S. Appl. No. 13/117,171, filed May 27, 2011.

"Ignite Where & Launch Pad", retrieved on Feb. 5, 2009 at <<http://en.oreilly.com/where2008/public/schedule/detail/2572>>, O'Reilly, Where 2.0 Conference 2008, May 2008, 4 pages.

"Time Domain" http://web/archive/org/web/20111026011954/http://www.timedomain.com, Oct. 26, 2011, 2 pages.

Aalto et al., "Bluetooth and WAP Push Based Location-Aware Mobile Advertising System", retrieved on Feb. 5, 2009 at <<http://www.mediateam.oulu.fi/publications/pdf/496.pdf>>, ACM, MobiSYS '04, Jun. 6-9, 2004, Boston, MA, 10 pages.

Alzantot et al., "IPS: Ubiquitous Indoor Positioning System", http://wrc.ejust.edu/eg/IPS.html, 212-04-17, 3 pages.

Amin et al., "Fancy a Drink in Canary Wharf? A User Study on Location-Based Mobile Search," In Proceedings of the 12th IFIP TC 13 International Conference on Human-Computer Interaction: Part I, Aug. 24, 2009, 14 pages.

Angermann, et al., "Software Represenation for Heterogeneous Location Data Sources Using Probability Density Functions," International Symposium on Location Based Services for Cellular Users (LOCELLUS), 2001, Munich, Germany, 12 pages.

Ashbrook et al., "Using GPS to Learn Significant Locations and Predict Movement Across Multiple Users", Personal and Ubiquitous Computing, 7(5), Oct. 2003, 15 pages.

Azizyan et al., "SurroundSense: Mobile Phone Localization Using Ambient Sound and Light", retrieved on Feb. 5, 2009 at <<http://synrg.ee.duke.edu/papers/ surroundsense-poster.pdf> >, Sep. 22, 2008, 1 page.

Bahl et al., "RADAR: An In-Building RF-based User Location and Tracking System", retrieved on Feb. 5, 2009 at <<https://research.microsoft.corn/en-us/urn/people/padmanab/papers/infocom2000.pdf>>, Microsoft Research, Proceedings of IEEE Infocom 2000, Tel-Aviv, Israel, Mar. 2000, 10 pages.

Balakrishnan et al., "ITR: Scalable Location-Aware Monitoring (SLAM) Systems", retrieved on Feb. 5, 2009 at <<http://nms.lcs.mit.edu/projects/slarn/prop.pdf>>, Laboratory for Computer Science & Department of EECS, MIT, Cabridge, MA, Nov. 9, 2001, 31 pages.

Balas, "Indoor Localization of Mobile Devices for a Wireless Monitoring System Based on Crowdsourcing", Master of Science, Computer Science, School of Informatics, University of Edinburgh, 2011, 78 pages.

Bauer et al., "Using Wireless Phyiscal Layer Information to Construc Implicit Indentifiers", Hot Topics in Privacy Enhancing Technologies, Jul. 2008, 15 pages.

(56) References Cited

OTHER PUBLICATIONS

Beard, K., et al., "Estimating positions and paths of moving objects", Temporal Representation and Reasoning, 2000. TIME 2000. Proceedings. Seventh International Workshop on; Digital Object Identifier: 0.1109/TIME.2000.856597 Publication Year: 2000, 8 pages.

Beauregard et al., "Pedestrian Dead Reckoning: A Basis for Personal Positioning", 3rd Workshop on Positioning, Navigation and Communication, Mar. 16, 2006, 10 pages.

Biegel et al., "A Framework for Developing Mobile, Context-Aware Applications," Proceedings of the Second IEEE Annual Conference on Pervasive Computing and Communications, PerCom 2004, Mar. 14-17, 2004, pp. 361-365, 5 pages.

Billinghurst, Mark, et al., "An Evaluation of Wearable Information Spaces", Proceedings of the Virtual Reality Annual International Symposium, 1998, 8 pages.

Billinghurst, Mark, et al., "Research Directions in Wearable Computing", University of Washington, May 1998, 48 pages.

Billinghurst, Mark, et al., "Wearable Devices: New Ways to Manage Information", IEEE Computer Society, Jan. 1999, pp. 57-64.

Bisdikian et al., "Intelligent Pervasive Middleware for ContextBased and Localized Telematics Services," Proceedings of the Second International Workshop on Mobile Commerce, Sep. 28, 2002, pp. 15-24, 10 pages.

Brik et al., "Wireless Device Identification with Radiometric Signatures", 14 ACM International Conference on Mobile Computing and Networking, Sep. 14, 2008, 13 pages.

Bulusu et al., "GPS-less Low Cost Outdoor Localization for Very Small Devices", IEEE Personal Communications, vol. 7, Issue 5, Oct. 2000, 7 pages.

Cabero, Jose M., et al., "People Tracking Based on Dynamic Weighted MultiDimensional Scaling", MSWIM '07, Oct. 22-26, 2007, Chania, Crete Island, Greece, available at <http://www.ri.cmu.edu/pub_files/pub4/maria_cabero_jose_2007_1/maria_cabero_jose_2007_1.pdf>, (Oct. 22, 2007), 8 pages.

Chang et al., "Progressive Lane Analysis in the Digital Map using Fuzzy Method", Department of Computer Science and Engineering Tatung University, 2006, 4 pages.

Chen et al., "HarpiaGrid: A Reliable Grid-based Rounding Protocol for Vehicular Ad Hoc Networks", Intelligent Transportation Systems, ITSC 2008, 11th International IEEE Conference, 6 pages.

Chen et al., "Modeling Route Choice Behavior from Smart-phone GPS Data," Transport and Mobility Laboratory, Ecole Polytechnique Federale de Lausanne, Nov. 5, 2009, 12 pages.

Chen, Guanling, et al., "A Survey of Context-Aware Mobile Computing Research," Dartmouth Computer Science Technical Report, 2000, 16 pages.

Cheng, et al., "Location Prediction Algorithms for Mobile Wireless Systems," Wireless Internet Handbook: Technologies, Standards, and Applications, 2003, CRC Press, Boca Raton, FL, 17 pages.

Chinese Notice of Allowance in Application 200680036290.9, dated Jan. 22, 2010, 4 pages.

Chinese Office Action in Application 200680036290.9, dated Sep. 4, 2009, 7 pages.

Chinese Office Action in Application 200680036290.9, dated Mar. 20, 2009, 10 pages.

Chinese Office Action in Application 201380038072.9, dated Dec. 31, 2015, 14 pages.

Chinese Office Action in Application 201380046819.5, dated Mar. 3, 2016, 13 pages.

Chinese Office Action in Application 201380046819.5, dated Nov. 3, 2016, 10 pages.

Chintalapudi et al., "Indoor Localization Without the Pain", Sixteenth Annual International Conference on Mobile Computing and Networking, Sep. 20-24, 2010, 12 pages.

Choi, Jae-Hyeong, et al., "Performance evaluation of traffic control based on geographical information", Intelligent Computing and Intelligent Systems, 2009. ICIS 2009. IEEE International Conference on; vol. 3; Publication Year: 2009, 5 pages.

Chun, Byung-Gon et al., "CloneCloud: Elastic Execution between Mobile Device and Cloud", In Proceedings of EuroSys 2011, Available at <http://eurosys2011.cs.uni-salzburg.at/pdf/eurosys2011-chun.pdf>, (Apr. 2011), 14 pages.

Collin, Jussi et al., "Indoor Positioning System using Accelerometry and High Accuracy Heading Sensors", In Proceedings of GPS/GNSS 2003, Available at <http://plan.geomatics.ucalgary.ca/papers/gps03jussic.pdf>, (Sep. 2003), pp. 1-7.

Constandache et al., "Energy-Aware Localization Using Mobile Phones", retrieved on Feb. 5, 2009 at <<http://www.cs.duke.edu/-ionut/2008_mobisys.pdf>>, Jun. 2008, 1 page.

Coyne et al., "Comparison of Differentially Corrected GPS Sources for Support of Site-Specific Management in Agriculture", Jul. 2003, Kansas State University Agricultural Experiment Station and Cooperative Extension Service, 35 pages.

De Moraes, Luis F., et al., "Calibration-Free WLAN Location System Based on Dynamic Mapping of Signal Strength", 9th Symposium on Modeling, Analysis, and Simulation of Wireless and Mobile Systems, Oct. 2-6, 2006, MobiWac '06, Torremolinos, Malaga, Spain, available at <http//:www.ravel.ufrij.br/arquivosPublicacoes/WACII-demoraes.pdfs, (Oct. 2, 2006), 8 pages.

Dissanayake et al., "A Solution to the Simultaneous Localization and Map Building (SLAM) Problem," retrieved at http://ieeexplore.ieee.org/stamp/stamp.jsp?tp=&arnumber=938381, Proceedings: IEEE Transactions on Robotics and Automation, vol. 17, No. 3, Jun. 2001, pp. 229-241, 13 pages.

Elfes et al., "Using Occupancy Grids for Mobile Robot Perception and Navigation," IEEE Computer, 1989, 22(6), pp. 46-57, 12 pages.

European Extended Search Report in Application 06802991.7, dated Jun. 14, 2012, 6 pages.

Flinn, Jason, "Extending Mobile Computer Battery Life through Energy-Aware Adaptation", retrieved on Feb. 5, 2009 at <<http://reports-archive.adm.cs.cmu.edu/anon/200I/CMU-CS-01-171.pdf>>, School of Computer Science, Carnegie Mellon University, Pittsburgh, PA, Dec. 2001, 165 pages.

Fox et al., "Monte Carlo Localization: Efficient Position Estimation for Mobile Robots", Sixteenth National Conference Jn Artificial Intelligence, Jul. 1999, 7 pages.

Gaonkar et al., "Micro-Blog: Sharing and Querying Content Through Mobile Phones and Social Participation", ACM, MobiSys 2008, Jun. 17-20, 2008, Breckenridge, CO, 13 pages.

Ghasemzadeh, et al. "Action coverage formulation for power optimazation in body sensor networks" In Proceedings of the 2008 Asia and South Pacific Design Automation Conference, IEEE Computer Society Press, Jan. 2008, pp. 446-451.

Gogate, et al., "Modeling Transportation Routines using Hybrid Dynamic Mixed Networks," Uncertainty in Artificial Intelligence (UAI), 2005, 8 pages.

Goldstone et al., "Group Path Formation," IEEE Transaction on Systems, Man and Cybernetics, Part A: Systems and Humans, 2006, vol. 36, Issue 3, 10 pages.

Goswami et al., "WiGEM: A Learning-Based Approach for Indoor Localization", Seventh Conference on Emerging Network Experiments and Technologies, Dec. 6, 2011, 12 pages.

Goyal, Vishal "MEMS Based Motion Sensing Design", Retrieved from: <http://www.eeherald.com/section/design-guide/mems_application.html> on Mar. 30, 2011, (2006), 2 pages.

Gusenbauer, et al., "Self-Contained Indoor Positioning on Off-TheShelf Mobile Devices", retrieved at <<http://ieeexplore.ieee.org/stamp/stamp/jsp? tp~&arnumbeF05646681>>, International Conference on Indoor Positioning and Indoor Navigation (IPIN), Sep. 2010, 9 pages.

Hariharan, et al., "Project Lachesis: Parsing and Modeling Location Histories," Geographic Information Science: Third International Conference, GI Science 2004, Adelphi, MD, Springer-Verlag GmbH, 19 pages.

Harter, Andy, et al., "A Distributed Location System for the Active Office," IEEE Network, 1994, pp. 62-70.

Horvitz, Eric, et al., "Attention-Sensitive Alerting in Computing Systems", Microsoft Research, Aug. 1999, 26 pages.

(56) References Cited

OTHER PUBLICATIONS

Horvitz, Eric, et al., "In Pursuit of Effective Handsfree Decision Support: Coupling Bayesian Inference", Speech Understanding, and User Models, 1995, 8 pages.
Hu et al., "Simulation-Assignment-Based Travel Time Prediction Model for Traffic Corridors," Intelligent Transportation Systems, IEEE Transactions, vol. PP, Issue 99, 2012, 10 pages.
Hu et al., "Summary of Travel Trends", 2001 National Household Survey, Dec. 2004, U.S. Department of Transportation, U.S. Federal Highway Administration, 135 pages.
Japanese Notice of Allowance in Application 2008-533377, dated Dec. 16, 2011, 6 pages.
Japanese Office Action in Application 2008-533377, dated May 31, 2011, 6 pages.
Jeong et al., "TBD: Trajectory-Based Data Forwarding for Light-Traffic Vehicular Networks," 29th IEEE International Conference on Distributed Computing Systems, Jun. 22-26, 2009, pp. 231-238, 8 pages.
Jimenez, "A Comparison of Pedestrian Dead-Reckoning Algorithms using a Low-Cost MEMS IMU", Aug. 26, 2009, WISP '09, pp. 37-42, http://www.iai.csic.es.users/fseco/papers/WISP2009Jimenez.pdf.
Jin, et al., "A Robust Dead-Reckoning Pedestrian Tracking System with Low Cost Sensors", Mar. 21, 2011, PCC '10, 9 pages, http://www.ami-lab.org/uploads/Publications/Conference/MVP2/Robust%20Dead-Reckoning%20Pedestrian%20Tracking%20System%20with%20Low%20Cost%20Sensors.pdf.
Joachims, T., "Text categorization with support vector machines: learning with many relevant features", Machine Learning, European Conference on Machine Learning, Apr. 21, 1998, pp. 137-142.
Kanoh et al., "Evaluation of GA-based Dynamic Rout Guidance for Car Navigation using Cellular Automata," Intelligent Vehicle Symposium, 2002, IEEE, vol. 1, pp. 178-183, 6 pages.
Kanoh et al., "Knowledge Based Genetic Algorithm for Dynamic Route Selection," Knowledge-Based Intelligent Engineering Systems and Allied Technologies, 2000, Proceedings Fourth International Conference on vol. 2, pp. 616-619, 4 pages.
Kanoh et al., "Route Guidance with Unspecific Staging Posts using Genetic Algorithm for Car Navigation Systems," Intelligent Transportation Systems, 2000, IEEE, pp. 119-124, 6 pages.
Kansal, Aman and Feng Zhao, "Location and Mobility in a Sensor Network of Mobile Phones," ACM SIGMM 17th International Workshop on Network and Operating Systems Support for Digital Audio & Video (NOSSDAV), Association for Computing Machinery, Inc., Urbana, IL, 2007, 6 pages.
Karbassi et al., "Vehicle Route Prediction and Time of Arrival Estimation Techniques for Improved Transportation System Management," Proceedings of the Intelligent Vehicles Symposium, 2003, pp. 511-516, 6 pages.
Kargl et al., "Smart Reminder—Personal Assistance in a Mobile Computing Environment," Proceedings of the International Conference on Pervasive Computing, Aug. 26-28, 2002, 6 pages.
Kim et al., "A Step, Stride and Heading Determination for the Pedestrian Navigation System", Journal of Global Positioning Systems, vol. 3, Issue 1-2, Dec. 6, 2004, 7 pages.
Kostov, V., et al., "Travel destination prediction using frequent crossing pattern from driving history", Intelligent transportation Systems, 2005. Proceedings. 2005 IEEE; Digital Object Identifier: 10.1109/ITSC.2005.1520182 Publication Year: 2005, pp. 343-350.
Koyuncu, Hakan et al., "A Survey of Indoor Positioning and Object Locating Systems", IJCSNS International Journal of Computer Science and Network Security, vol. 10, No. 5, May 2010, available at <http://paper.ijcsns.org/07 book/201005/20100518.pdf>, pp. 121-128.
Krumm et al., "Minimizing Calibration Effort for an Indoor 802.11 Device Location Measurement System", retrieved at <<http://research.microsoft.com/pubs/68919/tr-2003-82.pdf>>, Microsoft Research, Tech. Report. MSR-TR-2003-82, Nov. 13, 2003, 9 pages.
Krumm et al., "Predestination: Inferring Destinations from Partial Trajectories", UbiComp 2006: The Eighth International Conference on Ubiquitous Computing, Sep. 17-21, 2006, Orange County, CA, 18 pages.
Krumm et al., "RightSPOT: A Novel Sense of Location for a Smart Personal Object", retrieved on Feb. 5, 2009 at <<http:/ !research.microsoft.corn/en-us/urn/people/horvitz/rightspot.htrn>>, Proceedings of Ubicomp 2003, Seattle, WA, 1 page.
Krumm et al., "The Microsoft Multiperson Location Survey", (MSR-TR-2005-103), Aug. 2005, Microsoft Research, 3 pages.
Krumm, "Predestination: Where Do You Want to Go Today?"; Computer; vol. 40, Issue 4; Apr. 2007; 4 pages.
Krumm, John, "Real Time Destination Prediction Based on Efficient Routes," SAE Technical Paper, Paper No. 2006-01-0811, Apr. 3, 2006, 6 pages.
Lachapelle, Gerard "GNSS Indoor Location Technologies", Journal of Global Positioning Systems (2004) vol. 3, No. 1-2, Available at <http://www.gmat.unsw.edu.au/wang/jgps/v3n12/v3n12p01.pdf>, (Nov. 15, 2004), pp. 2-11.
Lai et al., "Hierarchical Incremental Pat Planning and SituationDependent Optimized Dynamic Motion Planning Considering Accelerations," Systems, Man, and Cybernetics, Part B: Cybernetics, IEEE Transactions on vol. 37, Issue 6, 2007, 14 pages.
Lamarca et al., "Place Lab: Device Positioning Using Radio Beacons in the Wild", retrieved on Feb. 5, 2009 at <<http://www.placelab.org/publications/pubs/pervasive-placelab-2005-final.pdf>>, Proceedings of Pervasive 2005, Munich, Germany, 18 pages.
Lee et al., "Crowdsourced Radiomap for Room-Level Place Recognition in Urban Environment", 8th IEEE International Conference on Pervasive Computing and Communications Workshops (PERCOM Workshops), Mar. 29, 2010, 6 pages.
Lee, Junghoon, et al., "Design and implementation of a movement history analysis frame-work for the Taxi telematics system", Communications, 2008. APCC 2008. 14th Asia-Pacific Conference on; Publication Year: 2008, pp. 1-4.
Leonard et al., "Simultaneous Map Building and Localization for an Autonomous Mobile Robot", International Norkshop on Intelligent Robots and Systems, Nov. 3-5, 1991, 6 pages.
Liao et al., "Extracting Places and Activities from GPS Traces Using Hierarchical Conditional Random Fields", retrieved on Feb. 5, 2009 at <<http://ijr.sagepub.com/cgi/content/abstract/26/1/119>>, The International Journal of Robotics Research, vol. 26, No. 1, 119-134, 2007, 1 page.
Liao, et al., "Learning and Inferring Transportation Route ins," Proceedings of the 19th National Conference on Artificial Intelligence (AAAI), 2004, San Jose, CA, 6 pages.
Lin et al., "Enabling Energy-Efficient and Quality Localization Services", retrieved on Feb. 5, 2009 at <<http://nslab.ee.ntu.edu.tw/publication/conf/qols-percom06.pdf>>, National Taiwan University, 2006, 4 pages.
Liu et al., "Location Awareness through Trajectory Prediction,"Computers, Environment and Urban Systems, Elsevier, retrieved at <<http://www.sis.pitt.edu/-xliu/papers/ceus.pdf>>, 2006, 38 pages.
Liu, Feng, et al., "Remaining Delivery Time Estimation Based Routing for Intermittently Connected Mobile Networks", Distributed Computing Systems Workshops, 2008. ICDCS '08. 28th International Conference, Publication Year: 2008, pp. 222-227.
Losee, Robert M. Jr., "Minimizing information overload: the ranking of electronic messages", Journal of Information Science 15, Elsevier Science Publishers B.V., 1989, pp. 179-189.
Malaysian Notice of Allowance in Application 20080636, dated Aug. 30, 2013, 3 pages.
Marmasse et al., "A User-Centered Location Model", Personal and Ubiquitos Computing, 2002(6), pp. 318-321, 4 pages.
Martin et al., "Dynamic GPS-position Correction for Mobile Pedestrian Navigation and Orientation," Proceedings of the 3rd Workshop on Positioning, Navigation and Communication, 2006, pp. 199-208.
Miyashita, K. et al., "A Map Matching Algorithm for Car Navigation Systems that Predict User Destination", Advanced Information Networking and Applications—Workshops, 2008. AINAW 2008. 22"d International Conference, Publication Year: 2008, pp. 1551-1556.

(56) References Cited

OTHER PUBLICATIONS

New Zealand Notice of Allowance in Application 566701, dated Jun. 11, 2010, 1 page.
Padmanabhan, Venkat, "The Quest for Zero-Effort Indoor Localization", retrieved at <<http://www.pdl.cmu.edu/SDI/2012/043012.html>>on Apr. 17, 2012, 1 page.
Patterson et al., "Opportunity Knocks: A System to Provide Dobnitive Assistance with Transportation Services", in UbiComp 2004: Ubiquitous Computing, 2004, Nottingham, UK; Springer, 18 pages.
Paul, Anindya S., et al., "Wi-Fi Based Indoor Localization and Tracking Using Sigma-Point Kalman Filtering Methods", IEEE/ION Position, Locationa dn Navigation Symposium, May 5-8, 2008, available at <http//:www.cse.ogi.edu/-anindya/Paul_Wan_Plans08.pdf>, (May 5, 2008), 14 pages.
PCT International Search Report and Written Opinion in PCT/US2000/20685, dated Sep. 29, 2003, 3 pages.
PCT International Search Report and Written Opinion in PCT/US2006/034608, dated Jan. 15, 2007, 4 pages.
PCT International Search Report and Written Opinion in PCT/US2008/067808, dated Dec. 12, 2008, 9 pages.
PCT International Search Report and Written Opinion in PCT/US2013/058350, dated Dec. 20, 2013, 9 pages.
Peng et al., "BeepBeep: A High Accuracy Acoustic Ranging System using COTS Mobile Devices", ACM, SenSys 2007, Nov. 6-9, 2007, Sydney, Australia, 14 pages.
Person, Jon, "Writing Your Own GPS Applications: Part 2", retrieved on Feb. 5, 2009 from <<http://www.codeproject.com/KB/mobile/WritingGPSApplications2.aspx>>, The Code Project, Dec. 20, 2004, 13 pages.
Philippine Office Action in Application 1-2008-500513, dated Sep. 9, 2011, 1 page.
Rhodes, Bradley J., "Remembrance Agent: A continuously running automated information retrieval system", The Proceedings of the First International Conference on the Practical Application of Intelligent Agents and Multi Agent Technology, 1996, pp. 487-495.
Rhodes, Bradley J., "The Wearable Remembrance Agent: A System for Augmented Theory", The Proceedings of the First International Symposium on Wearable Computers, Oct. 1997, pp. 123-128.
Rish, "An Empirical Study of the Nai've Bayes Classifier", IJCAI-01 Workshop on Empirical Methods in Al, Nov. 2, 2001, 7 pages.
Robertson et al., "Simultaneous Localization and Mapping for Pedestrians using only Foot-Mounted Inertial Sensors", 11th International Conference on Ubiquitous Computing, Sep. 30-Oct. 3, 2009, 4 pages.
Rogoleva, Luba "Crowdsourcing Location Information to Improve Indoor Localization", Master Thesis, available at <http://e-collection. ethbib.ethz.ch/eserv/eth: 1224/eth-1224-01pdf>, (Apr. 30, 2010), 91 pages.
Ruairi et al., "An Energy-Efficient, Multi-Agent Sensor Network for Detecting Diffuse Events", retrieved on Feb. 5, 2009 at <<http://www.aaai.org/Papers/IJCAI/2007/IJCAI07-224.pdf>>, IJCAI-07, 2007, pp. 1390-1395, 6 pages.
Russian Notice of Allownce in Application 2008112196, dated Jun. 8, 2010,.
Russian Office Action in Application 2008112196, dated Mar. 30, 2010, 5 pages.
Samaan et al., "A User Centric Mobility Prediction Approach Based on Spatial Conceptual Maps," 2005 IEEE International Conference on Communications, vol. 2, 5 pages.
Sananmongkhonchai, S. et al., "Cell-based traffic estimation from multiple GPS-equipped cars", 2009 IEEE Region 10 Conference Publication Year: 2009, 6 pages.
Schilit, Bill, et al., "Customizing Mobile Applications", Proceedings USENIX Symposium on Mobile and Location Independent Computing, Aug. 1993, 9 pages.
Schilit, Bill, et al., "Disseminating Active Map Information to Mobile Hosts", IEEE Network, 1994 pp. 22-32, vol. 8-No. 5.
Schilit, Bill, et al., "The ParcTab Mobile Computing System", IEEE WWOS-IV, 1993, 4 pages.
Schilit, William Noah, "A System Architecture for Context-Aware Mobile Computing", Columbia University, 1995, 153 pages.
Schindler et al., "City-Scale Location Recognition", retrieved on Feb. 5, 2009 at <<http://www.cc.gatech.edu/-phlosoft/files/schindler07cvpr2.pdf, IEEE Computer Society Conference on Computer Vision and Pattern Recognition (CVPR), 2007, 7 pages.
Scott et al., "Increased Accuracy of Motor Vehicle Position Estimation by Utilising Map Data, Vehicle Dynamics, and Other Information Sources," IEEE Vehicle Navigation and Information Systems Conference Proceedings, 1994, pp. 585-590.
Sen et al., "Precise Indoor Localization using PHY Layer Information", 9th International Conference on Mobile Systems, Applications and Services, Nov. 14-15, 2011, 6 pages.
Sen et al., "SpinLoc: Spin Once to Know Your Location", 13th Workshop on Mobile Computing Systems & Applications, Feb. 28-29, 2012, 6 pages.
Shin et al., "Sit-Down & Stand-Up Awareness Algorithm for the Pedestrian Dead Reckoning", May 3, 2009, GNSS '09, 6 pages http://s-space.snu.ac.kr/bitstream/10371/27736/1/Sit-Down%20&%20Stand-Up%20Awareness%20Algorithm%20for%20the%20Pedestrian%20Dead%20Reckoning.pdf.
Simmons, R, et al, "Learning to Predict Driver Route and Destination Intent", Intelligent Transportation Systems Conference, 2006. ITSC '06. IEEE; Digital Object Identifier: 10.1109/ITSC.2006.1706730 Publication Year: 2006, 6 pages.
Skog et al., "In-car Positioning and Navigation Technologies—a Survey," IEEE Transactions on Intelligent Transportation Systems, vol. 10, No. 1, Mar. 2009, pp. 1-17.
Smailagic et al., "Location Sensing and Privacy in a Context-Aware Computing Environment", IEEE Wireless Communications, Oct. 2002, pp. 10-17, 8 pages.
Smith et al., "On the Representation and Estimation of Spatial Uncertainty", International Journal of Robotics Research, vol. 5, No. 4, May 1986, 13 pages.
Spreitzer, Mike, et al., "Architectural Considerations for Scalable, Secure, Mobile Computing with Location Information", In the 14th International Conference on Distributed Computing Systems, Jun. 1994, pp. 29-38.
Spreitzer, Mike, et al., "Providing Location Information in a Ubiquitous Computing Environment", SIGOPS '93, 1993, pp. 270-283.
Spreitzer, Mike, et al., "Scalable, Secure, Mobile Computing with Location Information", Communications of the ACM, Jul. 1993, 1 page, vol. 36-No. 7.
Starner, Thad Eugene, "Wearable Computing and Contextual Awareness", Massachusetts Institue of Technology, Jun. 1999, 248 pages.
Subramanian et al., "Drive-by Localization of Roadside WiFi Networks," IEEE Infocom Conference, Apr. 13-18, 2008, 9 pages.
Sun et al., "Signal Processing Techniques in Network-Aided Positioning—A survery of state-of-the-art positioning designs", IEEE Signal Processing Magazine, Jul. 2005, 12 pages.
Surveying using GPS Precise Point Positioning, Jul. 31, 2008, available at: http://ieeexplore.ieee.org/stamp/stamp.jsp?tp=&arnumber=4570872.
Terada, T, et al., "Design of a Car Navigation System that Predicts User Destination", Mobile Data Management, 2006. MDM 2006. 7th International Conference on; Publication Year: 2006, 6 pages.
Theimer, Marvin, et al., "Operating System Issues for PDA's", in Fourth Workshop on Workstation Operating Systems, 1993, 7 pages.
Thiagarajan et al., "Cooperative Transit Tracking Using SmartPhones," SenSy' 10, Zurich, Switzerland, Nov. 3-5, 2010, pp. 85-98, 14 pages.
Toledo-Moreo, Rafael et al., "Lane-Level Integrity Provision for Navigation and Map Matching With GNSS, Dead Reckoning, and Enhanced Maps", IEEE Transactions on Intelligent Transportation Systems, vol. 11, No. 1, Available at <http://ieeexplore.ieee.org/stamp/stamp.jsp?tp~&arnumbeF5286855>, (Mar. 2010), pp. 100-112.
Toledo-Moreo, Rafael et al., "Performance Aspects of Navigation Systems for GNSS-Based Road User Charging", In Proceedings of ION GNSS 2010, Available at <http://ants.inf.um.es/-josesanta/doc/ION_GNSSIO.pdf>, (Sep. 2010), 9 pages.

(56) References Cited

OTHER PUBLICATIONS

U.S. Appl. No. 11/426,540, Amendment and Response dated Nov. 21, 2009, 9 pages.
U.S. Appl. No. 11/426,540, Amendment and Response dated Jul. 6, 2010, 11 pages.
U.S. Appl. No. 11/426,540, Amendment and Response dated Jan. 25, 2011, 12 pages.
U.S. Appl. No. 11/426,540, Notice of Allowance dated Apr. 15, 2011, 7 pages.
U.S. Appl. No. 11/426,540, Office Action dated Sep. 3, 2009, 8 pages.
U.S. Appl. No. 11/426,540, Office Action dated Apr. 6, 2010, 9 pages.
U.S. Appl. No. 11/426,540, Office Action dated Oct. 14, 2010, 16 pages.
U.S. Appl. No. 11/733,701, Amendment and Response dated Jun. 26, 2009, 11 pages.
U.S. Appl. No. 11/733,701, Amendment and Response dated Dec. 2, 2009, 10 pages.
U.S. Appl. No. 11/733,701, Amendment and Response dated Mar. 27, 2012, 12 pages.
U.S. Appl. No. 11/733,701, Office Action dated Mar. 26, 2009, 11 pages.
U.S. Appl. No. 11/733,701, Office Action dated Oct. 21, 2009, 14 pages.
U.S. Appl. No. 11/733,701, Office Action dated Dec. 23, 2011, 14 pages.
U.S. Appl. No. 12/417,752, Amendment and Response dated Oct. 27, 2011, 17 pages.
U.S. Appl. No. 12/417,752, Amendment and Response dated Dec. 13, 2012, 13 pages.
U.S. Appl. No. 12/417,752, Amendment and Response dated Jul. 2, 2013, 16 pages.
U.S. Appl. No. 12/417,752, Amendment and Response dated Sep. 30, 2013, 18 pages.
U.S. Appl. No. 12/417,752, Amendment and Response dated Dec. 23, 2013, 21 pages.
U.S. Appl. No. 12/417,752, Office Action dated Jun. 28, 2011, 15 pages.
U.S. Appl. No. 12/417,752, Office Action dated Sep. 13, 2012, 18 pages.
U.S. Appl. No. 12/417,752, Office Action dated May 24, 2013, 18 pages.
U.S. Appl. No. 12/417,752, Office Action dated Jul. 17, 2013, 18 pages.
U.S. Appl. No. 12/417,752, Office Action dated Oct. 29, 2013, 17 pages.
U.S. Appl. No. 12/417,752, Office Action dated Feb. 25, 2014, 22 pages.
U.S. Appl. No. 12/954,545, Amendment and Response dated Sep. 24, 2012, 13 pages.
U.S. Appl. No. 12/954,545, Amendment and Response dated Feb. 13, 2013, 11 pages.
U.S. Appl. No. 12/954,545, Amendment and Response dated Jun. 24, 2013, 12 pages.
U.S. Appl. No. 12/954,545, Notice of Allowance dated Nov. 26, 2012, 9 pages.
U.S. Appl. No. 12/954,545, Notice of Allowance dated Jul. 11, 2013, 10 pages.
U.S. Appl. No. 12/954,545, Office Action dated Jun. 5, 2012, 10 pages.
U.S. Appl. No. 12/954,545, Office Action dated Mar. 1, 2013, 8 pages.
U.S. Appl. No. 13/117,171, Amendment and Response dated Oct. 28, 2013, 8 pages.
U.S. Appl. No. 13/152,299, Amendment and Response dated May 19, 2014, 6 pages.
U.S. Appl. No. 13/152,299, Notice of Allowance dated Jun. 17, 2014, 7 pages.
U.S. Appl. No. 13/152,299, Notice of Allowance dated OCt. 31, 2014, 5 pages.
U.S. Appl. No. 13/152,299, Office Action dated May 7, 2014, 4 pages.
U.S. Appl. No. 13/183,050, Amendment and Response dated Oct. 10, 2014, 11 pages.
U.S. Appl. No. 13/183,050, Amendment and Response dated Feb. 25, 2015, 17 pages.
U.S. Appl. No. 13/183,050, Notice of Allowance dated Oct. 20, 2015, 17 pages.
U.S. Appl. No. 13/183,050, Notice of Allowance dated Mar. 14, 2016, 5 pages.
U.S. Appl. No. 13/183,050, Notice of Allowance dated Jun. 10, 2016, 5 pages.
U.S. Appl. No. 13/183,050, Notice of Allowance dated Sep. 13, 2016, 2 pages.
U.S. Appl. No. 13/183,050, Office Action dated Sep. 24, 2013, 11 pages.
U.S. Appl. No. 13/183,050, Office Action dated Jun. 11, 2014, 19 pages.
U.S. Appl. No. 13/183,050, Office Action dated Nov. 26, 2014, 22 pages.
U.S. Appl. No. 13/183,050, Office Action dated Jun. 18, 2015, 23 pages.
U.S. Appl. No. 13/183,124, Notice of Allowance dated Jul. 22, 2015, 17 pages.
U.S. Appl. No. 13/183,124, Notice of Allowance dated Nov. 16, 2015, 8 pages.
U.S. Appl. No. 13/183,124, Notice of Allowance dated Feb. 29, 2016, 24 pages.
U.S. Appl. No. 13/183,124, Notice of Allowance dated Jun. 14, 2016, 10 pages.
U.S. Appl. No. 13/183,124, Office Action dated May 28, 2014, 21 pages.
U.S. Appl. No. 13/183,124, Office Action dated Feb. 3, 2015, 29 pages.
U.S. Appl. No. 13/183,124, Response and Amendment dated Sep. 29, 2014, 13 pages.
U.S. Appl. No. 13/183,124, Response and Amendment dated May 4, 2015, 16 pages.
U.S. Appl. No. 13/183,124, Supplemental Notice of Allowance dated Aug. 4, 2015, 2 pages.
U.S. Appl. No. 13/183,124, Supplemental Notice of Allowance dated Aug. 27, 2015, 2 pages.
U.S. Appl. No. 13/183,124, Supplemental Notice of Allowance dated Aug. 10, 2016, 7 pages.
U.S. Appl. No. 13/190,121, Amendment and Response dated Apr. 19, 2012, 9 pages.
U.S. Appl. No. 13/190,121, Amendment and Response dated Mar. 11, 2013, 11 pages.
U.S. Appl. No. 13/190,121, Amendment and Response dated Sep. 25, 2013, 11 pages.
U.S. Appl. No. 13/190,121, Amendment and Response dated Apr. 15, 2014, 14 pages.
U.S. Appl. No. 13/190,121, Amendment and Response dated Sep. 30, 2014, 15 pages.
U.S. Appl. No. 13/190,121, Amendment and Response dated Dec. 8, 2015, 15 pages.
U.S. Appl. No. 13/190,121, Appeal Brief dated Sep. 26, 2016 27 pages.
U.S. Appl. No. 13/190,121, Examiner's Answer to Appeal Brief dated Dec. 15, 2016, 7 pages.
U.S. Appl. No. 13/190,121, Notice of Allowance dated Sep. 4, 2012, 7 pages.
U.S. Appl. No. 13/190,121, Office Action dated Jan. 19, 2012, 8 pages.
U.S. Appl. No. 13/190,121, Office Action dated Dec. 12, 2012, 8 pages.
U.S. Appl. No. 13/190,121, Office Action dated Jun. 27, 2013, 10 pages.
U.S. Appl. No. 13/190,121, Office Action dated Jan. 15, 2014, 9 pages.

(56) References Cited

OTHER PUBLICATIONS

U.S. Appl. No. 13/190,121, Office Action dated Jul. 1, 2014, 11 pages.
U.S. Appl. No. 13/190,121, Office Action dated Jan. 28, 2015, 12 pages.
U.S. Appl. No. 13/190,121, Office Action dated Sep. 8, 2015, 13 pages.
U.S. Appl. No. 13/190,121, Office Action dated Mar. 4, 2016, 14 pages.
U.S. Appl. No. 13/284,128, Advisory Action dated Aug. 19, 2016, 5 pages.
U.S. Appl. No. 13/284,128, Amendment and Response dated Nov. 17, 2014, 15 pages.
U.S. Appl. No. 13/284,128, Amendment and Response dated Jan. 15, 2016, 16 pages.
U.S. Appl. No. 13/284,128, Amendment and Response dated Aug. 1, 2016, 11 pages.
U.S. Appl. No. 13/284,128, Amendment and Response dated Sep. 9, 2016, 12 pages.
U.S. Appl. No. 13/284,128, Office Action dated Aug. 15, 2014, 28 pages.
U.S. Appl. No. 13/284,128, Office Action dated May 12, 2015, 33 pages.
U.S. Appl. No. 13/284,128, Office Action dated Sep. 17, 2015, 23 pages.
U.S. Appl. No. 13/284,128, Office Action dated Nov. 8, 2016, 31 pages.
U.S. Appl. No. 13/325,065, Amendment and Response dated Jan. 23, 2014, 20 pages.
U.S. Appl. No. 13/325,065, Notice of Allowance dated Jun. 4, 2014, 12 pages.
U.S. Appl. No. 13/325,065, Notice of Allowance dated Sep. 19, 2014, 7 pages.
U.S. Appl. No. 13/325,065, Notice of Allowance dated Dec. 31, 2014, 5 pages.
U.S. Appl. No. 13/325,065, Notice of Allowance dated Jun. 5, 2015, 6 pages.
U.S. Appl. No. 13/325,065, Notice of Allowance dated Sep. 10, 2015, 7 pages.
U.S. Appl. No. 13/325,065, Notice of Allowance dated Oct. 22, 2015, 2 pages.
U.S. Appl. No. 13/325,065, Notice of Allowance dated Dec. 17, 2015, 6 pages.
U.S. Appl. No. 13/325,065, Notice of Allowance dated Mar. 28, 2016, 7 pages.
U.S. Appl. No. 13/325,065, Notice of Allowance dated Jun. 7, 2016, 7 pages.
U.S. Appl. No. 13/325,065, Office Action dated Oct. 24, 2013, 31 pages.
U.S. Appl. No. 13/551,613, Amendment and Response dated Nov. 13, 2014, 17 pages.
U.S. Appl. No. 13/551,613, Amendment and Response dated Jun. 16, 2015, 16 pages.
U.S. Appl. No. 13/551,613, Amendment and Response dated Dec. 12, 2015, 13 pages.
U.S. Appl. No. 13/551,613, Amendment and Response dated May 9, 2016, 5 pages.
U.S. Appl. No. 13/551,613, Notice of Allowance dated Jun. 6, 2016, 5 pages.
U.S. Appl. No. 13/551,613, Office Action dated Aug. 13, 2014, 10 pages.
U.S. Appl. No. 13/551,613, Office Action dated Mar. 11, 2015, 15 pages.
U.S. Appl. No. 13/551,613, Office Action dated Jul 16, 2015, 11 pages.
U.S. Appl. No. 13/551,613, Office Action dated Mar. 9, 2016, 5 pages.
U.S. Appl. No. 13/606,008, Amendment and Response dated Nov. 11, 2015, 13 pages.
U.S. Appl. No. 13/606,008, Notice of Allowance dated Dec. 9, 2015, 18 pages.
U.S. Appl. No. 13/606,008, Office Action dated May 11, 2015, 20 pages.
U.S. Appl. No. 13/606,029, Advisory Action dated Feb. 23, 2016, 3 pages.
U.S. Appl. No. 13/606,029, Amendment and Response dated Nov. 17, 2015, 14 pages.
U.S. Appl. No. 13/606,029, Amendment and Response dated Feb. 11, 2016, 9 pages.
U.S. Appl. No. 13/606,029, Amendment and Response dated Jul. 19, 2016, 17 pages.
U.S. Appl. No. 13/606,029, Amendment and Response dated Dec. 12, 2016, 12 pages.
U.S. Appl. No. 13/606,029, Office Action dated Aug. 7, 2015, 16 pages.
U.S. Appl. No. 13/606,029, Office Action dated Dec. 4, 2015, 6 pages.
U.S. Appl. No. 13/606,029, Office Action dated Apr. 4, 2016, 15 pages.
U.S. Appl. No. 13/606,029, Office Action dated Oct. 4, 2016, 15 pages.
U.S. Appl. No. 14/504,451, Amendment and Response dated Aug. 5, 2016, 9 pages.
U.S. Appl. No. 14/504,451, Office Action dated May 5, 2016, 4 pages.
U.S. Appl. No. 14/504,451, Office Action dated Nov. 17, 2016, 6 pages.
Vanajakshi et al., "Support Vector Machine Technique for the Short Term Prediction of Travel Time," Intelligent Vehicles Symposium, 2007 IEEE, 6 pages.
Vaughan-Nichols, S.J., "Will Mobile Computing's Future Be Location, Location, Location?", Computer; vol. 42, Issue: 2 Digital Object Identifier: 10.1109/MC.2009.65; Publication Year: 2009, 4 pages.
Want, Roy, "Active Badges and Personal Interactive Computing Objects", IEEE Transactions on Consumer Electronics, 1992, 11 pages, vol. 38-No. 1.
Want, Roy, et al., "The Active Badge Location System", ACM Transactions on Information Systems, Jan. 1992, pp. 91-102, vol. 10-No. 1.
Wei et al., "PATS: A Framework of Pattern-Aware Trajectory Search," In IEEE Eleventh International Conference on Mobile Data Management (MDM), May 23, 2010, pp. 372-377, 6 pages.
Wei, Chien-Hung, et al., "Development of Freeway Travel Time Forecasting Models by Integrating Different Sources of Traffic Data", IEEE Transactions on Vehicular Technology; vol. 56, Issue: 6, Part: 2; Nov. 2007, pp. 3682-3694.
Weiser, Mark, "Some Computer Science Issues in Ubiquitous Computing", Communications of the ACM, Jul. 1993, pp. 75-84, vol. 36-No. 7.
Weiser, Mark, "The Computer for the 21st Century", Scientific American, Sep. 1991, 8 pages.
Wendlandt, Kai et al., "Continuous Location and Direction Estimation with Multiple Sensors Using Particle Filtering", International Conference on Multisensor Fusion and Integration for Intelligent Systems, 2006 IEEE, Available at <http://ieeexplore.ieee.org/stamp/stamp.jsp?arnumbeF04042026>, (Sep. 2006), 6 pages.
Wu, Yan-Jing, et al., "A dynamic navigation scheme for vehicular ad hoc networks", Networked Computing and Advanced Information Management (NCM), 2010 Sixth International Conference on; Publication Year: 2010, pp. 231-235.
Xie, M. et al., "Development of Navigation System for Autonomous Vehicle to Meet the DARPA Urban Grand Challenge", Intelligent Transportation Systems Conference, 2007. ITSC 2007. IEEE; Sep. 30-Oct. 3, 2007, Seattle, WA; pp. 767-772.
Xiong et al., "ArrayTrack: A Fine-Grained Indoor Location System", 13th International Workshop on Mobile Computing System and Applications, Feb. 28, 2012, 6 pages.
Xuan, "Crowd Sourcing Indoor Maps with Mobile Sensors", Dec. 6, 2010, MUS '10, 12 pages, http://www.ocf.berkeley.edu/~xuanyg/IndoorMap_Mobiquitous2010_ver2.pdf.

(56) References Cited

OTHER PUBLICATIONS

Ye, Qian, et al, "Predict Personal Continuous Route"; 2008; International IEEE Conference on Intelligent Transportation Systems, Oct. 12-15, 2008, Beijing, China; 6 pages.

Youssef et al., "The Horus WLAN Location Determination System", 3rd International Conference on Mobile Systems, Applications and Services, Jun. 6, 2005, 14 pages.

Zhang et al., "The Two Facets of the Exploration-Exploitation Dilemma", Proceedings of the IEEE/WIC/ACM International Conference on Intelligent Agent Technology (IAT '06), 2006, 7 pages.

Zheng et al., "HIPS: A Calibration-less Hybrid Indoor Positioning System Using Heterogeneous Sensors", PerCom J009, IEEE International Conference on Pervasive Computing and Communications, Mar. 9, 2009, 6 pages.

Zhu, et al., "Indoor/Outdoor Location of Cellular Handsets Based on Received Signal Strength", Electronics Letters, vol. 41, No. 1, available at <http://ieeexplore.ieee.org/stamp/stamp.jsp?amumbeF01543256>, (Jan. 6, 2005), 2 pages.

LOW ACCURACY POSITIONAL DATA BY DETECTING IMPROBABLE SAMPLES

RELATED APPLICATIONS

This application is a divisional of Ser. No. 13/152,299 filed on Jun. 3, 2011, now issued as U.S. Pat. No. 8,981,995, which is incorporated herein by reference.

BACKGROUND

Various systems, hereinafter referred to as "tracker systems", and methods, hereinafter "wireless location technologies" (WILOTs), for wireless determination of a location of a mobile transmitter and/or receiver terminal and a person or object, a "bearer", carrying or mounted with the mobile terminal, are known. Common transmitter and/or receiver terminals that incorporate and/or are located by WILOT tracker systems are mobile phones, global positioning satellite (GPS) receivers, computers, personal data assistants (PDAs), and workbooks. Among common wireless location technologies employed by tracker systems to determine a location of a mobile transmitter and/or receiver and thereby its bearer, are technologies referred to as trilateration and multilateration. Hereinafter, a transmitter and/or receiver, and/or a device in which it is housed, and/or its bearer, that are located by a tracker system are distinguished as being a "target", used as a modifier or noun, of the tracker system.

In some WILOT tracker systems using trilateration location technologies and apparatus, signals from three or four transmitters having known locations are received by a target receiver and used to determine a transit time from each transmitter to the target receiver. Each transit time defines a spherical surface having its center at the transmitter for which the transit time was determined and a radius equal to the speed of light times the transit time. Were all the transit times and locations of the transmitters known with absolute accuracy, the spherical surfaces would have a well defined common intersection point, at which the target receiver would be located.

In practice of course, the transit times and transmitter locations are not known with absolute accuracy, and the spherical surfaces in general do not intersect at a well defined common point. The target receiver (and thereby its bearer), is therefore generally determined to be located in a region of uncertainty (ROU) in which all the spheres come closest to intersecting. A size of the ROU and therefore accuracy of location is dependent on, among other factors, accuracy of synchronization of clocks in the transmitters and receiver that are used to determine transit times between the transmitters and the receiver.

Size of an ROU associated with a location of a target is assumed to be determined by a characteristic linear dimension, such as a radius or diameter, of an area of uncertainty associated with the location. An ROU having a characteristic dimension "X", in given units of length may be recited as an "ROU of X" in the given units. An ROU, unless otherwise specified is assumed to have a centroid coincident with a target location with which it is associated. For a circular ROU the center of the ROU circle is coincident with the target location. An ROU, unless otherwise specified, is considered to have a spatial location defined by a target location with which it is associated and reference to the ROU is considered to include a reference to its associated target location.

In tracker systems that use the GPS system, GPS receivers, such as are commonly available for locating vehicles and persons, are located by trilateration using clock signals transmitted from at least three GPS satellites. GPS satellite clock signals are generally accurate to ±200 ns (nanoseconds) relative to Universal Time Coordinated (UTC) and some GPS systems can locate a receiver in an ROU having a characteristic dimension of a few tens of centimeters.

A trilateration technology may of course be used in "reverse", with a single transmitter transmitting signals to three or four receivers to provide signal transit times useable to determine a location of the transmitter.

In WILOT tracker systems using multilateration location technologies and apparatus, time differences of arrival, or differences in signal strength, of signals from three or more synchronized transmitters received at a receiver are used to determine location of the receiver. Mobile phone networks may use multilateration location systems in which synchronized base station transmitters from different cells in the network transmit signals to mobile terminals, such as mobile phones, personal digital assistants (PDA), and laptop computers, to provide locations for the mobile terminals.

Accuracy of positioning provided by a mobile phone network multilateration technology is generally less than accuracy of location provided by GPS based trilateration technologies. Accuracy may be influenced by size of the cells in the mobile phone network, which may have characteristic dimension that range from about 100 m (meters) to about 3 km (kilometers). Usually, a mobile phone network provides locations having ROUs of dimensions between about 1,000 m (meters) and about 2,000 m.

As in trilateration location technologies, multilateration location technologies may be operated in "reverse", with differences between times of arrival or signal strengths of signals from a single transmitter received at three or four receivers being used to determine location of the single transmitter.

Many mobile terminals are now equipped with inertial navigators. An inertial navigator typically comprises a set of accelerometers and gyroscopes and integrates measurements of acceleration provided by the accelerometers and gyroscopes to "dead reckon" a path traveled by the navigator from a starting location. A terminal point of the integrated path provides a location of the navigator and the navigator's bearer relative to the starting location. Whereas an inertial navigator operates differently than the examples of WILOT systems discussed above, an inertial navigator is considered a WILOT tracker and is distinguished from other WILOT trackers when its differences from other WILOT trackers are pertinent to the discussion.

Errors in a location provided by an inertial navigator propagate and tend to increase as time over which a path is integrated and length of the integrated path increases. Inexpensive accelerometers and gyroscopes comprised in a consumer inertial navigator suffer from drift that degrades accuracy of location provided by the navigator relatively rapidly with integration time and/or path length of a path the navigator integrates. As a result, ROUs for locations determined by commercial inertial navigators may have characteristic dimensions that grow to hundreds of meters over a dead reckoning integration period of about a half hour.

Whereas GPS based tracker systems generally provide the most accurate determinations of locations, they require relatively large amounts of power, and generally do not function at locations for which line of sight to at least three GPS satellites is not available. Various multilateral and trilateral tracker systems are subject to disturbance by multipath signaling, in which energy from a same signal travels by more than one path to a target receiver, arrives at the receiver at different times, and degrades measurements of signal transit times and/or signal strengths. Accuracy of both trilateral and multilateral tracker systems is compromised by loss or degradation of synchronization between clocks in the systems. As a result, the various WILOT tracker systems often become erratic and provide locations for a target that are unreliable.

SUMMARY

An embodiment of the invention relates to providing a tracker system, hereinafter referred to as a "Discriminating Tracker", that provides locations for a target responsive to locations provided by a WILOT tracker that are corrected for locations which are aberrant when considered relative to other locations provided for the target. Aberrant WILOT locations are hereinafter also referred to as "outlier locations" or "outliers". Optionally, if a location provided by the WILOT tracker is determined to be an outlier location, the Discriminating Tracker does not use the WILOT location and/or an ROU associated with the WILOT location to determine a location and/or an associated ROU for the target. In an embodiment of the invention, if a WILOT location for the target is classified as an outlier, the Discriminating Tracker operates to acquire at least one additional location for the target from another WILOT tracker for a time close to a time for which the outlier location is acquired. If the at least one location provided by the other WILOT tracker and the outlier location are consistent, the outlier location is considered to be corroborated as a valid location that may be used for locating the target.

In an embodiment of the invention, a Discriminating Tracker comprises a processor that receives data from a WILOT tracker defining a set, also referred to as a "sample set", of at least one location, at which a target was present at different times during a given period of time. The processor processes the data to determine an expected location and a variance of the expected location for a location of the target provided by the WILOT tracker and/or for a parameter associated with a location provided by the WILOT tracker. An associated parameter may, by way of example, be acceleration, velocity, or direction associated with motion of the target.

The processor uses the expected value and variance to determine if a location provided by the WILOT tracker is to be considered an outlier location. Optionally, the processor uses the expected location and variance to define an expected region of uncertainty (EROU) for the location provided by the WILOT tracker. Optionally, the EROU has a centroid located at the expected location associated with the EROU. In an embodiment of the invention, if the target location provided by the WILOT tracker lies outside the EROU, the WILOT location is classified as an outlier. Optionally, the WILOT location is a location, hereinafter a "future location", for the target at a time later than a latest time for which a location in the sample set of locations is provided.

It is noted that an EROU for a target location in accordance with an embodiment of the invention is not necessarily circular, and may for example be elliptical or have an irregular shape. A circular EROU implies that probability of displacement of a target location from an expected target location associated with the EROU is independent of direction of the displacement. An elliptical EROU indicates that displacement of a target location from an expected location of the target may be less probable along one direction of two orthogonal directions than along the other of the two orthogonal directions. An irregular EROU may be indicated for a spatially asymmetric dependence of displacement of a target location from an expected target location associated with the EROU.

In an embodiment of the invention, a sample set of locations is used to determine a habitual motion pattern for a target that is associated with a given set of circumstances. For example, a habitual motion pattern may be established by a Discriminating Tracker responsive to a plurality of locations along a same route that a person drives back and forth to work every day in a car tracked by a WILOT tracker. The habitual motion pattern may also comprise an end location that is a same parking spot at work in which the person parks his or her car every day. Deviation from traveling the habitual route to work or parking the car in the habitual parking spot may result in a location provided by the WILOT tracker being classified as an outlier location.

In the discussion unless otherwise stated, adjectives such as "substantially" and "about" modifying a condition or relationship characteristic of a feature or features of an embodiment of the invention, are understood to mean that the condition or characteristic is defined to within tolerances that are acceptable for operation of the embodiment for an application for which it is intended.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical structures, elements or parts that appear in more than one figure are generally labeled with a same numeral in all the figures in which they appear. Dimensions of components and features shown in the figures are chosen for convenience and clarity of presentation and are not necessarily shown to scale.

DETAILED DESCRIPTION

Figure 1A:
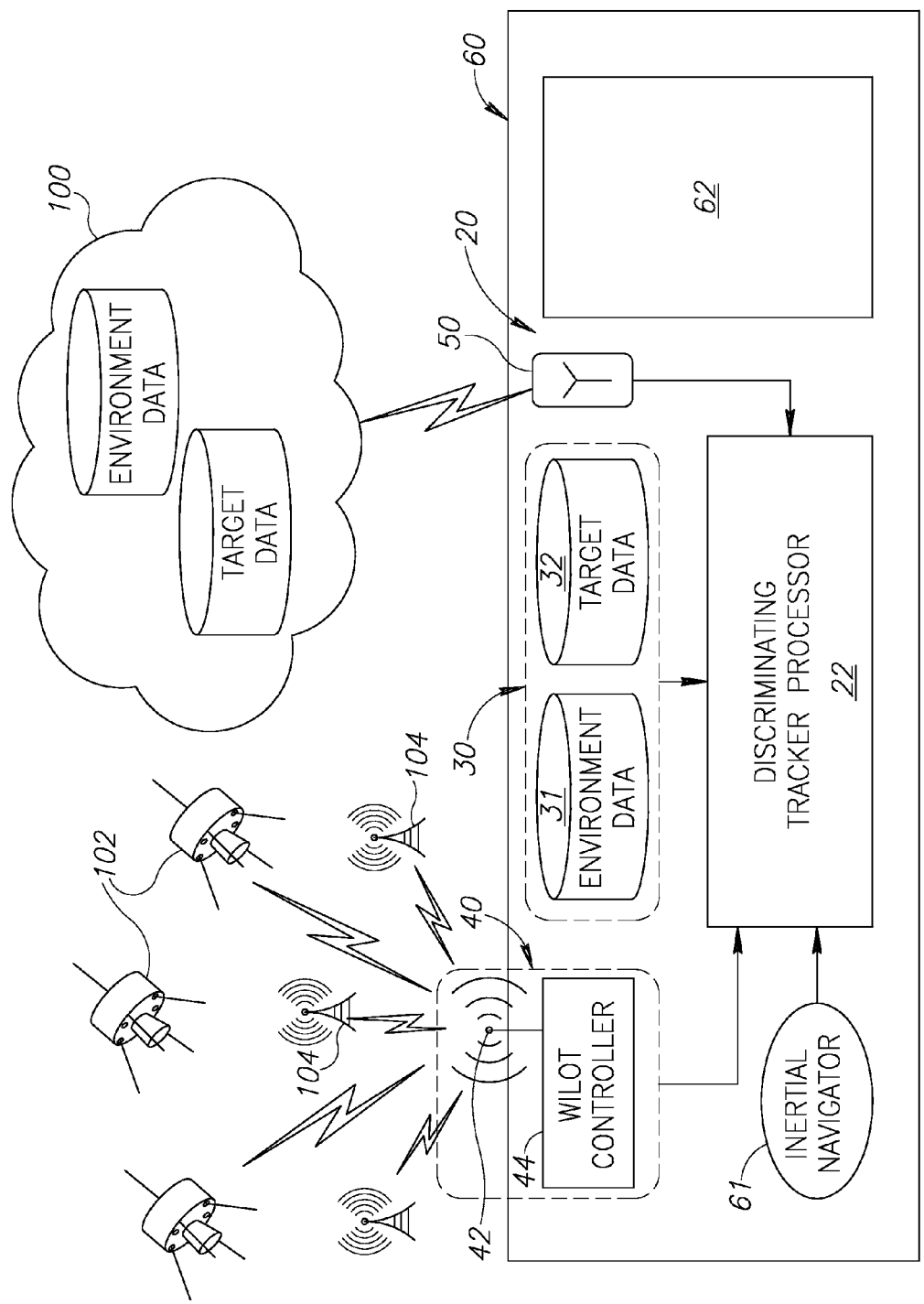
FIG. 1A schematically shows components of a Discriminating Tracker, in accordance with an embodiment of the invention.
Figure 1B:
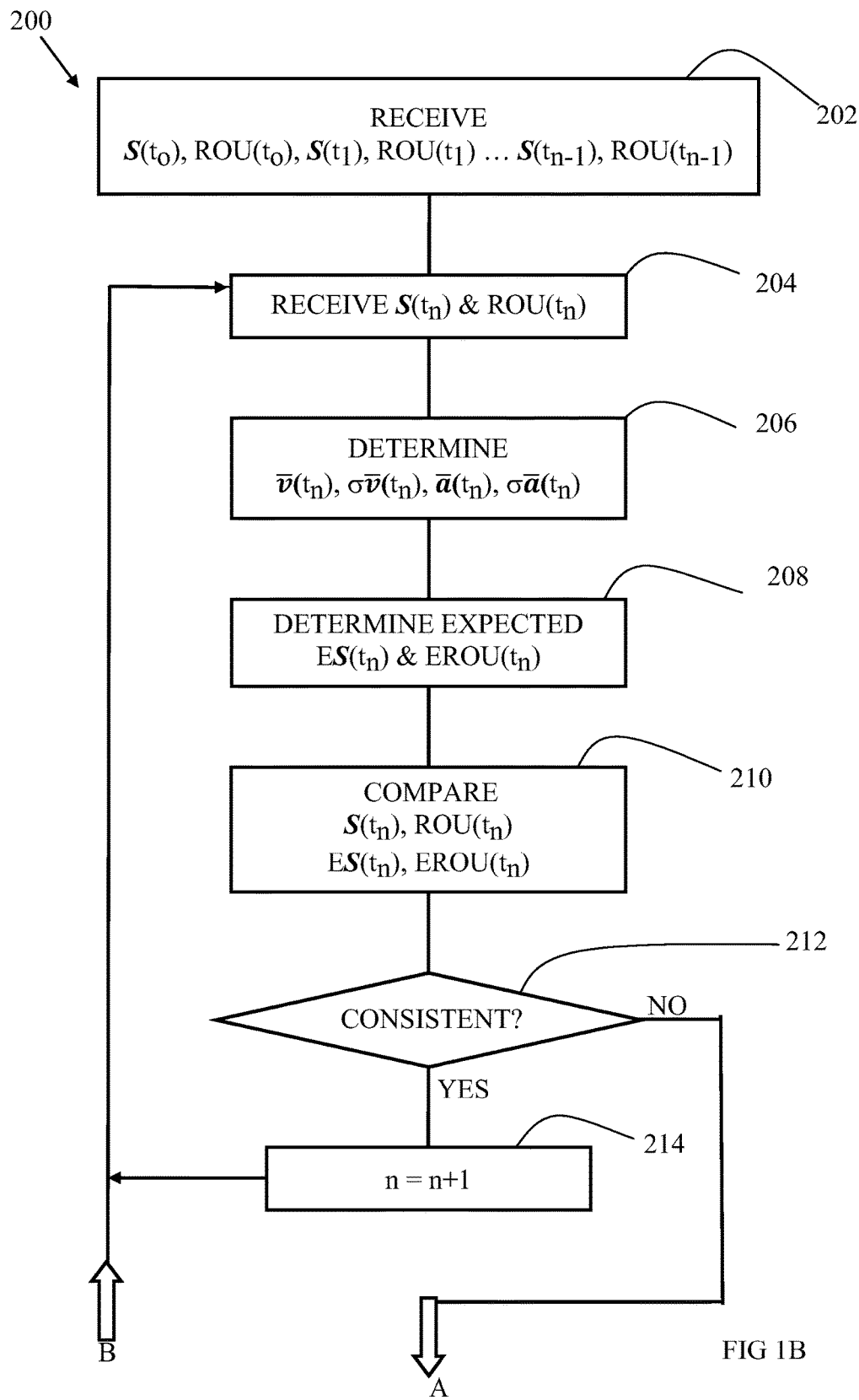
FIGS. 1B and 1C show a flow diagram of an algorithm that a Discriminating Tracker uses to determine if a location provided for the target by a WILOT tracker is an outlier location, in accordance with an embodiment of the invention.
Figure 1C:
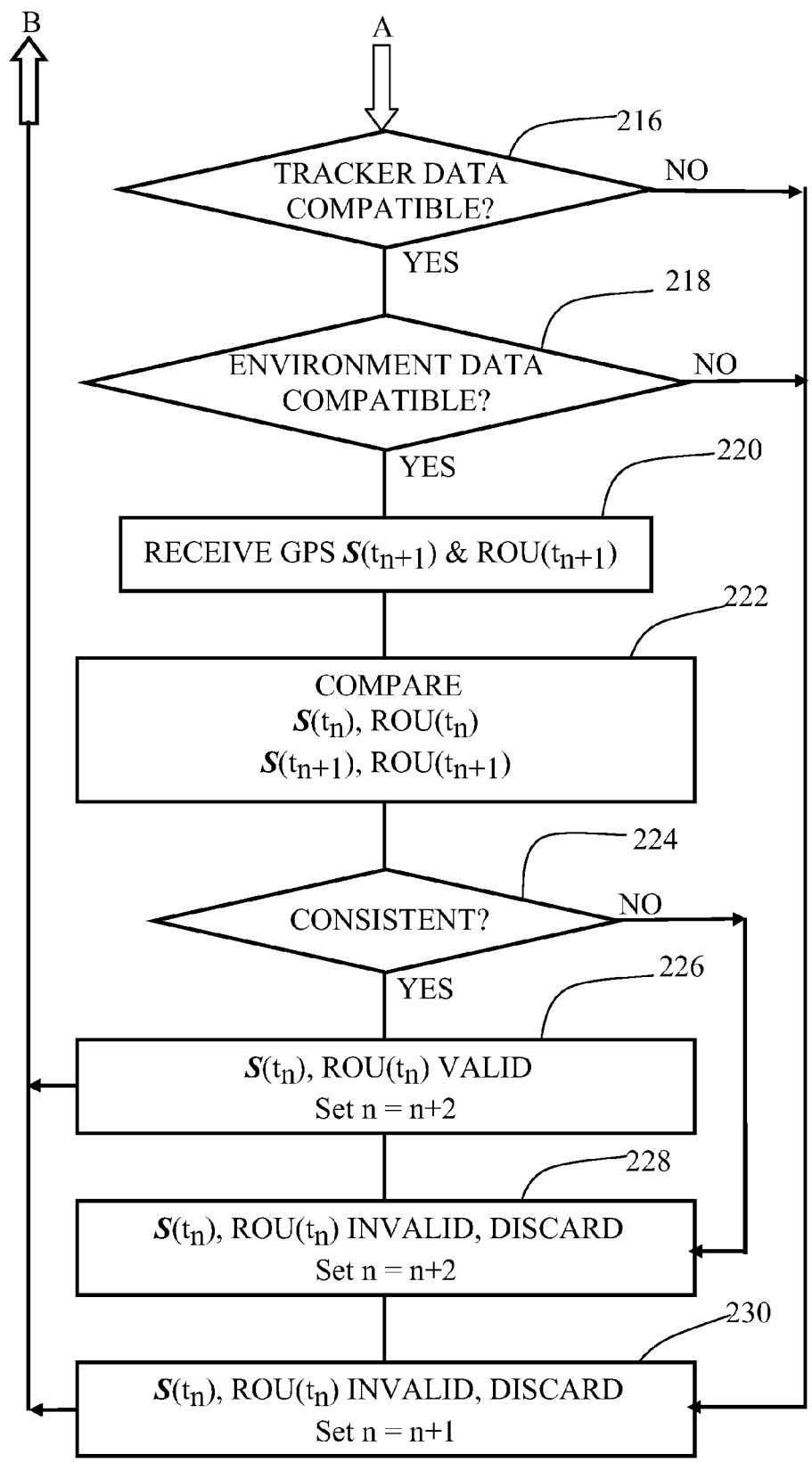

In the following detailed description, a Discriminating Tracker, in accordance with an embodiment of the invention, that provides locations for a target that processes data defining locations for the target provided by a WILOT tracker to determine whether to classify the locations as outlier locations is discussed with reference to FIGS. 1A and 1B. FIG. 1A schematically shows components of the Discriminating Tracker, and FIG. 1B presents a flow diagram of an algorithm that the Discriminating Tracker may use to determine whether a location for a target provided by the WILOT tracker is to be classified as an outlier location.

Operation of a Discriminating Tracker in detecting and processing outlier locations generated by a WILOT tracker tracking motion of a tractor-trailer making a cargo delivery is described and discussed with reference to FIG. 2.

FIG. 1A schematically shows a Discriminating Tracker 20, for providing locations for a target that, optionally, comprises a processor 22, at least one memory device 30, and a mobile WILOT target terminal 40. Optionally, Discriminating Tracker 20 comprises a wireless network interface 50 that enables the system wireless access to the internet 100. In an embodiment of the invention, as schematically shown in FIG. 1A, Discriminating Tracker processor 22, memory device 30, internet interface 50, and WILOT target terminal 40 are housed in a same mobile device 60. Optionally, the mobile device comprises an inertial navigator 61. Optionally, the mobile device comprises a user interface 62, such as a keyboard, touch screen, microphone, and/or speaker. Mobile device 60 may be any of various mobile devices such as a mobile phone, personal digital assistant (PDA), laptop computer, or a tablet computer.

WILOT target terminal 40 comprises a receiver and/or transmitter represented by an antenna 42 for transmitting and/or receiving WILOT signals to and/or from an infrastructure of at least one WILOT tracker system, a controller 44, and associated computer instruction sets, application specific integrated circuits (ASICS), and/or systems on a chip, that the processor uses for processing the signals. The at least one WILOT tracker system may comprise any of various WILOT tracker systems implementing any of various wireless location technologies, and may for example, comprise a GPS tracker system, a mobile phone network tracker system, and any combination of such systems. In the present discussion it is assumed that WILOT terminal 40 is configured to support a mobile telephone tracker system and a GPS tracker system, and in FIG. 1A WILOT terminal 40 is schematically shown communicating with satellites 102 of the GPS system infrastructure and with base stations 104 of the mobile phone tracker infrastructure.

Optionally, controller 44 processes WILOT signals transmitted to and/or received from the GPS infrastructure and/or the mobile phone infrastructure to determine spatial locations and associated ROUs of WILOT target terminal 40, and thereby for device 60 and a bearer of the device. In a default mode Discriminating Tracker 20 operates to provide WILOT locations for device 60 based on the mobile phone tracker system. Processor 22 receives data defining the locations provided by WILOT terminal 40 and processes the data to determine whether locations it receives are outlier locations, and if and how locations classified as outlier locations may be used to determine locations for the target. Operation of processor 22 in determining which WILOT locations are to be classified as outliers and circumstances under which Discriminating Tracker 20 operates to provide GPS locations are described below in a discussion of a flow diagram of an algorithm that the processor optionally uses to make the determination.

In an embodiment of the invention, memory device 30 has a database 32 stored therein comprising data defining features of a target for which Discriminating Tracker 20 provides locations and that the Discriminating Tracker may use to discriminate outlier locations provided by a WILOT tracker for the target. Optionally the target features are used to determine expected target locations and their associated variances that are used to discriminate outliers. The features may, by way of example, comprise features and conditions of a person and/or a vehicle that bears the Discriminating Tracker, and records of trips made by the person and/or the vehicle and its driver. Optionally, memory device 30 has stored therein a database 31 comprising data defining features of an environment in which the target moves that the Discriminating Tracker may use in discriminating outlier locations provided for the target. Environment features may for example comprise road conditions that limit a speed with which a target vehicle bearing the Discriminating tracker can travel. Examples of how target and environment features may be used in discriminating outliers are discussed below.

Whereas in the above description all components of Discriminating Tracker 20 are described as being housed in a same mobile device (device 60 in FIG. 1A), practice of the invention is not limited to "centralized" Discriminating Tracker in which all, or substantially all of the Discriminating Tracker components are in a single device or location. A Discriminating Tracker may have a distributed configuration with components at different locations. For example, memory device 30 may reside in at least one first stationary server, and Discriminating Tracker processor 22 may reside in a second server at a location different from a location of the at least one first server. Environment and target data may be stored, as shown in FIG. 1A, at least partially in cloud based databases that reside in the internet 100.

FIG. 1B shows a flow diagram of an algorithm 200 that Discriminating Tracker processor 22 optionally uses to discriminate outlier locations provided by WILOT terminal 40 for a target of the tracker.

In a block 202, processor 22 (FIG. 1A) receives locations $S(t_o)$, $S(t_1)$, ... $S(t_{n-1})$, and associated ROUs $ROU(t_o)$, $ROU(t_1)$ ... $ROU(t_{n-1})$ for the target from WILOT terminal 40 for each of a plurality of consecutive times $t_o$, $t_1$, $t_2$, $t_3$, ... $t_{n-1}$. The letter "S" used above in designations of locations is bold faced and italicized to indicate that the locations are vector quantities. In a block 204 an additional n-th location $S(t_n)$ and associated $ROU(t_n)$ for the target is received for a time $t_n$. The reception of $S(t_n)$ and $ROU(t_n)$ in a block separate from block 202 is made for convenience of presentation. In blocks 202 and 204 Discriminating Tracker is optionally operating in a default mode in which WILOT terminal 40 provides locations $S(\cdot)$ and $ROU(\cdot)$s responsive to signals received from the mobile phone network tracker.

In a block 206 processor 22 determines an average velocity $\bar{v}(t_n)$ and an average acceleration $\bar{a}(t_n)$ of the target for time $t_n$ and variances $\sigma\bar{v}(t_n)$ and $\sigma\bar{a}(t_n)$ of the averages respectively responsive to the locations $S(\cdot)$ and $ROU(\cdot)$s received from the WILOT terminal. Optionally, the averages and variances are moving averages and variances determined from a last "N" locations $S(\cdot)$ and $ROU(\cdot)$s including $S(t_{n-1})$ and $ROU(t_{n-1})$. In a block 208, processor 22 optionally determines an estimate $ES(t_n)$ for location $S(t_n)$ of the target for time $t_n$ and an associated ROU estimate, $EROU(t_n)$ for $ES(t_n)$.

In a block 210, the processor compares the received $S(t_n)$ and $ROU(t_n)$ to the estimates $ES(t_n)$ and $EROU(t_n)$. In a decision block 212 the processor decides if the comparison performed in block 210 indicates that the received and estimated locations and ROUs are statistically consistent. In an embodiment of the invention $S(t_n)$ and $ES(t_n)$ are considered to be statistically consistent if a distance $|S(t_n)-ES(t_n)|$ is less than or equal to about an average of characteristic lengths defining sizes of $ROU(t_n)$ and $EROU(t_n)$. If $S(t_n)$ and $ES(t_n)$ are determined to be consistent, in a block 214 the processor accepts the received location $S(t_n)$ and its associated $ROU(t_n)$ as valid indications of the location of the target, increases n to n+1, and returns to block 204 to receive a next location and ROU from WILOT terminal 40 and proceed again to decision block 214.

If on the other hand in decision block 212 processor 22 determines that the received and estimated locations are not statistically consistent, processor skips block 214 and optionally proceeds to a block 216. In block 216 processor 22 vets received $S(t_n)$ and $ROU(t_n)$ to determine if they are compatible with tracker data describing features of the target for which $S(t_n)$ and $ROU(t_n)$ are determined. For example, while $S(t_n)$ and $ROU(t_n)$ for the target may not be statistically consistent with estimates $ES(t_n)$ and $EROU(t_n)$ because $S(t_n)$ is displaced too far from $S(t_{n-1})$, physical features and condition of the target may in fact enable the target to move from $S(t_{n-1})$ to $S(t_n)$ in a time $(t_n - t_{n-1})$. If $S(t_n)$ and $ROU(t_n)$ are incompatible with tracker data, processor 22 proceeds to a block 230 discards $S(t_n)$ and $ROU(t_n)$ as invalid, increases n to n+1, and returns to block 204.

If received $S(t_n)$ and $ROU(t_n)$ are determined in block 216 to be compatible with target data, processor 22 proceeds to a decision block 218 to determine if received $S(t_n)$ and $ROU(t_n)$ are compatible with environment data. For example, even if the target is physically capable of moving from $S(t_{n-1})$ to $S(t_n)$ in a time $(t_n - t_{n-1})$ in flat terrain, it might not be able to do so in hilly terrain. If $S(t_n)$ and $ROU(t_n)$ are incompatible with environment data, processor 22 proceeds to block 230 discards $S(t_n)$ and $ROU(t_n)$ as invalid, increases n to n+1, and returns to block 204. On the other hand if $S(t_n)$ and $ROU(t_n)$ are compatible with environment data, the processor proceeds to a block 220.

In block 220 Discriminating Tracker 20 controls WILOT terminal 40 to provide a location $S(t_{n+1})$ and associated $ROU(t_{n+1})$ responsive to signals from the GPS tracker system supported by WILOT terminal 40. Whereas providing GPS locations consumes a relatively large amount of energy in comparison to an amount of energy consumed in providing WILOT locations using the mobile phone network tracker, the GPS locations and ROUs are generally substantially more accurate and reliable than those provided by the mobile phone tracker. The GPS locations are therefore advantageous for use in vetting mobile phone tracker WILOT locations to determine if they are outliers.

In a block 222 processor 22 compares $S(t_{n+1})$ and ROU $(t_{n+1})$ to GPS $S(t_n)$ and $ROU(t_n)$. In a decision block 224, the processor decides whether the comparison performed in block 224 indicates whether $S(t_n)$ and $ROU(t_n)$ are consistent or inconsistent with the GPS location $S(t_{n+1})$ and $ROU(t_{n+1})$. If they are consistent, processor 22 proceeds to a block 226 accepts $S(t_n)$ and $ROU(t_n)$ as valid, increase n to n+1 and returns to block 204. If however, $S(t_n)$ and $ROU(t_n)$ are determined to be inconsistent with the GPS location and ROU, the processor proceeds to block 228 where it discards $S(t_n)$ and $ROU(t_n)$ as invalid, increases n to n+1 and returns to block 204.

Figure 2:
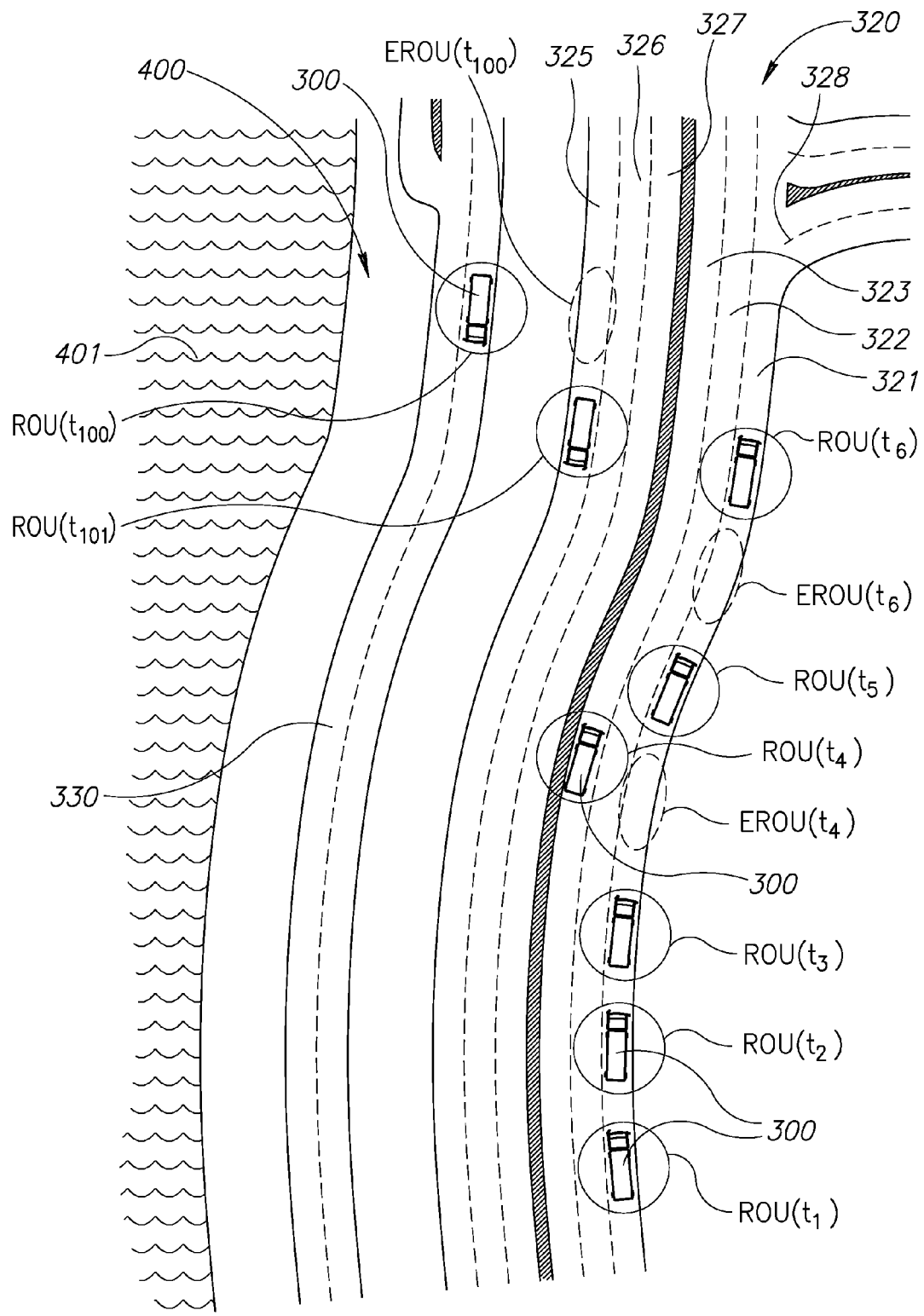
FIG. 2 schematically shows a Discriminating Tracker tracking a tractor-trailer moving along a coastal highway responsive to locations provided by a WILOT tracker and identifying outlier locations provided by the WILOT tracker, in accordance with an embodiment of the invention.

FIG. 2 schematically illustrates performance of an algorithm similar to algorithm 200 in a scenario in which a Discriminating Tracker in accordance with an embodiment of the invention operates to track a tractor-trailer 300 and detect and process outlier locations. The tractor-trailer is assumed to belong to a delivery company having a fleet of trucks that it tracks using the Discriminating Tracker to provide cargo delivery services to its customers. The Discriminating Tracker is similar to a Discriminating Tracker, such as Discriminating Tracker 20 or variations thereof, described above. Optionally, Discriminating Tracker 20 is configured as a distributed system having components of the Discriminating Tracker comprised in a company dispatch center (not shown), tractor-trailer 300, and the internet.

In an embodiment of the invention, tractor-trailer 300 is provided with a mobile device comprising a WILOT target terminal 40, an inertial navigator 61, and an internet interface 50 (FIG. 1A) and/or a mobile telephone terminal, optionally WILOT terminal 40, for communicating with the dispatch center. Optionally, the company dispatch center maintains a Discriminating Tracker processor, such as Discriminating Tracker processor 22 shown in FIG. 1A. Discriminating Tracker processor 22 may comprise an application stored on a company server, and/or an application, that is, a "cloud based" application, which is accessed by the dispatch center and/or by the tractor-trailer from the internet.

Optionally, the dispatch center maintains a target database 32 having a vehicle file for each of the company vehicles and a personal file for each of the company drivers, in a server at the dispatch center. A company vehicle file may comprise data specifying the vehicle, its history, and service record. A driver personal file may comprise data characterizing physical and/or psychological features of a driver. A personal file may, for example, comprise personal information provided by the driver, and/or statistical information generated by the Discriminating Tracker from past driving assignments, and/or information acquired from driver performance records. The dispatch center may also maintain on its server an environment database 31 having data characterizing natural and manmade features of the geographical region for which it provides delivery services. In an embodiment of the invention data in the company databases may be at least partially cloud based, that is, on the internet.

By way of example, tractor-trailer 300 is assumed to be moving along a six lane divided highway 320 having three northbound lanes 321, 322 and 323, and three southbound lanes 325 326 and 327, on its way to making a delivery. Highway 320 is located in a coastal region 400 bounded by the sea 401. A scenic route 330 is located in coastal region 400 between highway 320 and the sea. The tractor-trailer is moving in northbound lane 321, which is a trucking lane.

As tractor-trailer 300 moves along lane 321, WILOT terminal 40 generates location readings and associated ROUs for tractor-trailer 300 at regular time intervals. In FIG. 2 an ROU provided for a location of tractor-trailer 300 at a time "$t_n$" is schematically represented by a circle labeled $ROU(t_n)$ surrounding an image of tractor-trailer 300. A location $S(t_n)$ associated with a given $ROU(t_n)$ is assumed to be at the center of the circle. For convenience of presentation, locations $S(t_n)$ are not explicitly shown in FIG. 2 but are, as noted above assumed, to be at centroids of icons representing the $ROU(t_n)$s with which they are respectively associated. FIG. 2 schematically shows ROUs acquired for consecutive times arbitrarily designated $t_1, t_2, t_3, \ldots$.

In accordance with an embodiment of the invention, Discriminating Tracker processor 22 receives data defining the locations and ROUs generated by WILOT terminal 40 and processes the data to provide a moving average and variance of a velocity "$\bar{v}$" at which the tractor-trailer is moving, and optionally a moving average and variance "$\bar{a}$" and σa of its acceleration. Bold italicized text for v and a is used to indicate that v and a are vector variables. For convenience of presentation components of vectors v and a are measured parallel, transverse and perpendicular to a lane of highway 320. A component parallel to a lane is referred to as a longitudinal component. A component perpendicular to a lane is a vertical component of a vector perpendicular to the surface of the lane. A moving average is an average determined from a last "N" locations provided by the WILOT tracker. Optionally, the processor is configured with an instruction set to determine for a time $t_o$ the moving averages and variances $\bar{v}(t_n)$ and $\sigma\bar{v}(t_n)$, $\bar{a}(t_n)$ and $\sigma\bar{a}(t_n)$, by fitting a function of the form $S(t_n)=S(t_{n-1})+v\Delta t+(\frac{1}{2})a\Delta t^2$ to a last "N" locations $S(t_{n-N+1})$, $S(t_{n-N+2})$ ... $S(t_n)$ provided by the WILOT terminal for the tractor-trailer.

In an embodiment of the invention, Discriminating Tracker 20 uses $\bar{v}(t_n)$ and $\sigma\bar{v}(t_n)$, $\bar{a}(t_n)$ and $\sigma\bar{a}(t_n)$, to determine an expected value $ES(t_{n+1})$ and expected region of uncertainty $EROU(t_{n+1})$ for a next location $S(t_{n+1})$ provided by WILOT terminal 40 for the tractor-trailer. FIG. 2 schematically shows an $EROU(t_4)$ determined responsive to $\bar{v}(t_3)$, $\sigma\bar{v}(t_3)$, $\bar{a}(t_3)$, and $\sigma\bar{a}(t_3)$ as an ellipse. An expected location $ES(t_4)$ associated with $EROU(t_4)$ is assumed to be located at a centroid of the ellipse, which for the ellipse is coincident with the center of the ellipse. $EROU(t_4)$ is shown as elliptical because, in general, for travel along a same lane of a highway, it is expected that both $\bar{a}(t_n)$ and $\sigma\bar{a}(t_n)$ are in general very small compared to $\bar{v}(t_n)$ and $\sigma\bar{v}(t_n)$, and that an expected location of tractor-trailer 300 along a lane in highway 320 will therefore in general be characterized by a greater longitudinal variance $\sigma_L$ along the highway than a variance $\sigma_T$ transverse to the highway.

Whereas expected $ES(t_4)$ and $EROU(t_4)$ are shown in lane 321, WILOT terminal 40 provides a location $S(t_4)$ and $ROU(t_4)$ that indicates that tractor-trailer 300 is traveling in lane 323. Processor 22 compares $S(t_4)$ and $ROU(t_4)$ with $ES(t_4)$ and $EROU(t_4)$ to determine whether or not to classify $ROU(t_4)$ as an outlier. In an embodiment of the invention, processor 22 determines that $ROU(t_4)$ $S(t_4)$ is an outlier if a distance between $S(t_4)$ and $ES(t_4)$ is greater than a predetermined multiple of a variance of $ES(t_4)$. Optionally, $S(t_4)$ is classified as an outlier if a component of a difference $[S(t_4)-ES(t_4)]$ transverse to lane 321 is greater than $\sigma_T$ or if a component of $[(t_4)-ES(t_4)]$ along lane 321 is greater than $\sigma_L$. In FIG. 2, whereas the longitudinal component of $[S(t_4)-ES(t_4)]$ along lane 321 is not greater than $\sigma_L$, its transverse component is greater than $\sigma_T$ and therefore $S(t_4)$ is determined to be an outlier.

In response to determining that $S(t_4)$ is an outlier, in an embodiment of the invention Discriminating Tracker 20 stores data defining $S(t_4)$ optionally in memory device 30 and does not use $S(t_4)$ to provide updated values for the average velocity and acceleration and their associated variances, that is for determining to $\bar{v}(t_4)$, $\sigma\bar{v}(t_4)$, $\bar{a}(t_4)$, and $\sigma\bar{a}(t_4)$. Optionally, Discriminating Tracker 20 operates to determine if $S(t_4)$, which is classified as an outlier responsive to $\bar{v}(t_3)$, $\sigma\bar{v}(t_3)$, $\bar{a}(t_3)$, and $\sigma\bar{a}(t_3)$ is corroborated by a next location $S(t_5)$ for tractor-trailer 300 provided by WILOT terminal 40.

If $S(t_4)$ is corroborated by the next location Discriminating Tracker 20 uses $S(t_4)$ to determine values for velocity and acceleration and their respective variances for use in calculating expected values for $ES(t_n)$ and $ROU(t_n)$ for n greater than 5. If on the other hand $S(t_4)$ is not corroborated by $S(t_5)$ Discriminating Tracker 20 optionally discards $S(t_4)$ and does not use it, nor optionally, its associated $ROU(t_4)$ to determine future expected values for locations of tractor-trailer 300. By way of example, in FIG. 2, a next location $S(t_5)$ and $ROU(t_5)$ provided by WILOT terminal 40 appears to be consistent with $\bar{v}(t_3)$, $\sigma\bar{v}(t_3)$, $\bar{a}(t_3)$, and $\sigma\bar{a}(t_3)$, as a result of which, Discriminating Tracker confirms and discards $S(t_4)$.

By way of another example of an outlier location discriminated by Discriminating Tracker 20, $S(t_6)$ and $ROU(t_6)$ are located substantially farther along lane 321 than $ES(t_6)$ and $EROU(t_6)$. Whereas FIG. 2 schematically shows that a difference $[S(t_6)-ES(t_6)]$ transverse to lane 321 is equal to about zero and is less than $\sigma_T$, a component of $[S(t_6)-ES(t_6)]$ along lane 321 is shown greater than $\sigma_L \cdot S(t_6)$ is therefore classified as an outlier.

In an embodiment of the invention, Discriminating Tracker 20 corroborates a location provided by a first tracker system supported by WILOT terminal 40 with a location provided by a different tracker system supported by the WILOT terminal. For example, in a default operating mode Discriminating Tracker 20 may normally acquire locations for tractor-trailer 300 using the mobile phone network tracker system supported by WILOT terminal 40. To acquire a location to corroborate a location provided by the mobile phone network tracker system, Discriminating Tracker 20 optionally operates to acquire a location for tractor-trailer 300 using the GPS tracker system. For example, Discriminating Tracker 20 optionally acquires location $S(t_4)$ using the default mobile phone tracking network and location $S(t_5)$ using the GPS tracker system.

Discriminating Tracker 20 optionally, operates to acquire a GPS location if an amount of energy consumed by using the GPS tracker system is less than a predetermined threshold. For example, energy available to mobile device 60 may be limited and energy consumed by the GPS system may be consumed at an expense of energy available for supporting telecommunication services provided by mobile device 60. Discriminating Tracker 20 may therefore be configured to use the GPS tracker only if energy available for telecommunications is greater than a predetermined threshold minimum. A predetermined threshold may require that the GPS tracker system is used only if after its use mobile communication device 60 has enough energy to support transmission of telecommunication signals for at least sixty minutes.

Discriminating Tracker 20 may use information other than location and ROU information to determine and/or corroborate whether to classify a location $S(t_n)$ as an outlier. For example, inertial tracker 61 provides information relevant to acceleration that may be used to constrain a value for $\bar{a}(t_3)$, and $\sigma\bar{a}(t_3)$ used to determine if $S(t_4)$ is an outlier. Relative to $ROU(t_3)$, $ROU(t_4)$ indicates that between times $t_3$ and $t_4$ tractor-trailer 300 has undergone a transverse acceleration in switching from lane 321 to lane 323. If information received by processor 22 from inertial tracker 61 provides an upper limit to acceleration that tractor-trailer 300 has undergone between times $t_3$ and $t_4$, the upper limit may be used to constrain acceleration and its variance $\bar{a}(t_3)$, and $\sigma\bar{a}(t_3)$. If the constrained acceleration and variance are not consistent with the apparent change of lanes of tractor-trailer 300, the information provided by inertial navigator 61 supports classifying $S(t_4)$ as an outlier.

Target data available from target database 32 may also be used in determining whether or not $S(t_4)$ and $S(t_6)$ are outliers. Both $S(t_4)$ and $S(t_6)$ indicate that tractor-trailer 300 has undergone acceleration. The target data in memory device 30 may indicate that for the weight of cargo carried by the tractor-trailer, a maximum acceleration that the tractor-trailer can provide is less than that needed to move the tractor-trailer to locations indicated by $ROU(t_4)$ and $ROU(t_6)$ in time intervals $(t_4-t_3)$ and $(t_6-t_5)$ that are respectively available for making the moves.

At a time following $t_6$ tractor-trailer 300 is assumed to leave highway 320 at a turnoff 328 to deliver its cargo to its destination and return to a depot of the cargo company. The delivery is assumed to be a frequently repeated delivery to a regular customer. A record of the deliveries has established a pattern by which off loading the cargo at its destination is performed in an hour following which the tractor-trailer returns via southbound lanes 325 and 326 in highway 320. At a time $t_n$, arbitrarily referred to as $t_{100}$, WILOT terminal 40 provides data defining ROU($t_{100}$) and its associated location S($t_{100}$) indicating that tractor-trailer 300 is returning to the company depot via scenic route 330. While it is not impossible, nor against company rules for a driver to return tractor-trailer 300 via scenic route 330, returning via the scenic route does not follow an established habitual pattern for the delivery. Target data in target data base 32 indicates that historically, scenic route 330 is used to return tractor trailer 300 only once in ten deliveries. An expected, "habitual" EROU($t_{100}$) is schematically shown on lane 325 of highway 320.

In an embodiment of the invention, processor 22 is configured to classify a WILOT location as an outlier for a reason that it does not accord with an established habit, if under the circumstance for which the habit is established, the WILOT location has a percent probability of occurring that is less than or equal to about 10%. As a result, processor 22 classifies ROU($t_{100}$) and its associated location S($t_{100}$) as outliers, and checks if a next location, S($t_{101}$), corroborates S($t_{100}$). As indicated in the figure S($t_{101}$) is located in southbound lane 325 as expected from past behavior and S($t_{100}$) is considered spurious and discarded.

In an embodiment of the invention a WILOT location is considered an outlier because it does not accord with an established habit, if under the circumstance for which the habit is established, the WILOT location has a percent probability of occurring that is less than or equal to about 10%. For example, if for the delivery discussed above, scenic route 330 was historically used to return tractor trailer 300 only once in ten deliveries, then S($t_{100}$) and ROU($t_{100}$) are classified as outliers.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. An apparatus for determining a location of a mobile target, comprising:
    a wireless location technology tracker that provides locations of the target; and
    a processor operative to:
        generate moving averages for a velocity that characterizes motion of the moving target responsive to the locations;
        utilize the moving averages to determine whether a given location provided by the wireless location technology tracker is an outlier when compared to previously received locations; and
        utilize the given location as a location for the target if it is determined not to be an outlier.

2. The apparatus of claim 1, wherein the processor determines a variance for the moving average velocity responsive to the locations.

3. The apparatus of claim 2, wherein the processor is further operative to utilize the moving average velocity and its variance to determine an expected region of uncertainty for an expected location.

4. The apparatus of claim 3, wherein the processor is further operative to determine whether the given location is an outlier based, at least in part, on whether the given location is not consistent with the expected location and the expected region of uncertainty.

5. The apparatus of claim 1, wherein the processor is further operative to generate moving averages of an acceleration that characterizes motion of the moving target responsive to the locations provided by the wireless location technology tracker and utilize the moving average acceleration to determine whether the given location is an outlier.

6. The apparatus of claim 1, further comprising a target database comprising data defining features of the target.

7. The apparatus of claim 6, wherein if the given location is determined to be an outlier responsive to a moving average of the moving averages, the processor is further operative to utilize data defining features of the target comprised in the target database to determine whether the given location is not an outlier location.

8. The apparatus of claim 7, wherein the data features of the target comprises data defining habitual motion patterns of the target.

9. The apparatus of claim 8, wherein the target is a vehicle and the data defining features comprises data defining features of the vehicle.

10. The apparatus of claim 9, wherein the data defining features of the vehicle comprises at least one or any combination of more than one of data specifying the vehicle, data specifying records of trips made by the vehicle, data specifying condition of the vehicle, and data specifying service record of the vehicle.

11. The apparatus of claim 6, further comprising an environment database comprising data defining features of an environment in which the target moves.

12. The apparatus of claim 11, wherein if the location is determined to be an outlier responsive to a moving average of the moving averages, the processor is further operative to utilize data defining features of the environment comprised in the environment database to determine whether the given location is not an outlier location.

13. A method for determining a location of a mobile target, comprising:
    determining one or more locations of a moving target over a given time period;
    generating moving averages for a velocity that characterizes a motion of the moving target responsive to the locations;
    determining a variance of the moving averages for the velocity;
    using the moving averages and the variance of the moving averages to determine whether at least one location of the one or more locations is an outlier location; and
    using the at least one location of the one or more locations as a location for the target when it is determined that the at least one location of the one or more locations is not an outlier location.

14. The method of claim 13, further comprising:
    generating averages for an acceleration of the moving target; and using the averages of the acceleration of the moving target to determine whether the at least one location of the one more locations is an outlier location.

15. The method of claim 13, further comprising:

determining one or more environmental factors associated with the at least one location of the one or more locations; and using the one or more environmental factors to determine whether the at least one location of the one or more locations is an outlier location.

16. A method for determining a location of a target, comprising:

receiving, two or more locations of the target from a wireless location technology tracker;

generating moving averages for a velocity that characterizes motion of the target responsive to the two or more locations;

determining an expected location of the target, based, at least in part, on the two or more locations and the moving averages;

determining whether the expected location is within a threshold distance of at least one location of the two or more locations; and validating the at least one location of the two or more locations when the expected location is within the threshold distance of the at least one location.

17. The method of claim 16, further comprising determining an acceleration of the target and a direction of travel of the target.

18. The method of claim 16, further comprising:

determining one or more environmental conditions associated with the target; and determining whether the at least one location is compatible with the one or more environmental conditions.

19. The method of claim 18, further comprising discarding the at least one location when the at least one location is not compatible with the one or more environmental conditions.

20. The method of claim 16, further comprising utilizing the at least one location in a subsequent location determination when the at least one location is validated.

* * * * *